US012634242B2

(12) United States Patent
Li et al.

(10) Patent No.: US 12,634,242 B2
(45) Date of Patent: May 19, 2026

(54) ELECTRONIC DEVICE, COMMUNICATION METHOD, AND COMPUTER-READABLE STORAGE MEDIUM

(71) Applicant: Sony Group Corporation, Tokyo (JP)

(72) Inventors: Lantao Li, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 298 days.

(21) Appl. No.: 18/283,813

(22) PCT Filed: Jun. 24, 2021

(86) PCT No.: PCT/CN2021/101977
§ 371 (c)(1),
(2) Date: Sep. 25, 2023

(87) PCT Pub. No.: WO2022/205630
PCT Pub. Date: Oct. 6, 2022

(65) Prior Publication Data
US 2024/0171522 A1　May 23, 2024

(30) Foreign Application Priority Data

Apr. 2, 2021　(CN) .......................... 202110362225.1

(51) Int. Cl.
*H04L 47/6295* (2022.01)
*H04W 28/02* (2009.01)

(52) U.S. Cl.
CPC ..... *H04L 47/6295* (2013.01); *H04W 28/0268* (2013.01)

(58) Field of Classification Search
None
See application file for complete search history.

(56) References Cited

U.S. PATENT DOCUMENTS

2002/0032800 A1* 3/2002 Puuskari .............. H04W 76/12
709/230
2019/0182165 A1 6/2019 Yang
(Continued)

FOREIGN PATENT DOCUMENTS

CN 103944766 A 7/2014
CN 104244426 A 12/2014
(Continued)

OTHER PUBLICATIONS

TOKGOZ—U.S. Appl. No. 63/010,512 Provisional Application (Apr. 15, 2020) (Year: 2020).*
(Continued)

*Primary Examiner* — Andre Tacdiran
(74) *Attorney, Agent, or Firm* — XSENSUS LLP

(57) ABSTRACT

Provided are an electronic device, a communication method, and a computer-readable storage medium. The electronic device can comprise a processing circuit, which is configured to: generate association information for first data transmission of a first user equipment, wherein the association information indicates an association relationship between the first data transmission and second data transmission of the first user equipment or a second user equipment; and sending, to a base-station-side device, the association information together with a QoS parameter of a QoS flow that bears the first data transmission, so that the base-station-side device allocates a transmission resource for the first and/or second data transmission according to the association information.

14 Claims, 12 Drawing Sheets

100

Generation unit 110

Communication unit 120

(56) References Cited

U.S. PATENT DOCUMENTS

| | | |
|---|---|---|
| 2020/0008118 A1 | 1/2020 | Han |
| 2020/0120536 A1 | 4/2020 | Prakash |
| 2021/0329690 A1* | 10/2021 | Tokgoz ................. H04W 72/23 |

FOREIGN PATENT DOCUMENTS

| | | |
|---|---|---|
| CN | 107078766 A | 8/2017 |
| CN | 110475243 A | 11/2019 |
| CN | 110858958 A | 3/2020 |
| CN | 111491313 A | 8/2020 |
| CN | 111757341 A | 10/2020 |
| WO | 2020/077607 A1 | 4/2020 |

OTHER PUBLICATIONS

International Search Report and Written Opinion mailed on Jan. 4, 2022, received for PCT Application PCT/CN2021/101977, filed on Jun. 24, 2021, 9 pages including English Translation.

\* cited by examiner

100

200

ELECTRONIC DEVICE, COMMUNICATION METHOD, AND COMPUTER-READABLE STORAGE MEDIUM

CROSS-REFERENCE TO RELATED APPLICATIONS

This application is based on PCT filing PCT/CN2021/101977, filed Jun. 24, 2021, which claims priority to Chinese Patent Application No. 202110362225.1, titled "ELECTRONIC DEVICE, COMMUNICATION METHOD, AND COMPUTER READABLE STORAGE MEDIUM", filed on Apr. 2, 2021 with the China National Intellectual Property Administration, which is incorporated herein by reference in its entirety.

FIELD

The present disclosure relates to the technical field of wireless communications, and in particular to an electronic device, a communication method and a non-transitory computer readable storage medium which are beneficial to optimizing a process of allocating resources for a user equipment by a base station.

BACKGROUND

In the existing QoS (Quality of Service) mechanism, there are mainly two implementations to provide a base station with QoS parameters of a QoS flow for carrying data transmission of a terminal device, such that the base station allocates transmission resources to a terminal device (user equipment) that meet QoS requirements of the data transmission.

In a first implementation, the user equipment itself provides the base station with the QoS parameters of related QoS flows. In this implementation, based on transmission requirements of data transmission of the user equipment, the user equipment matches the data transmission with the existing QoS rules, so as to map the data transmission to the QoS flow corresponding to the matched QoS rules based on the matched QoS rules. If the current data transmission cannot match the existing QoS rules, the terminal device establishes a new QoS rule for the current data transmission (including determining relevant QoS parameters), establishes a QoS flow based on the QoS rule, and maps the data transmission to the established QoS flow. The user equipment may provide the base station with the QoS parameters of the QoS flow mapped with data transmission as described above, such that the base station can allocate resources for the terminal device based on the requirements of the QoS parameters.

In a second implementation, a core network device provides a base station with QoS parameters of a related QoS flow. In this implementation, the core network device maps data transmission of a user equipment to a QoS flow that conforms to the corresponding QoS rules, based on transmission requirements of the data transmission of the user equipment, PCF (Policy Control Function) rules from AF (Application Function) and strategies of operators, and provides the base station with the QoS parameters of the QoS flow, such that the base station can allocate resources for the user equipment based on the requirements of the QoS parameters.

However, in the above two implementations, the QoS parameters provided to the base station only involve the requirements such as a delay and a packet loss rate, without consideration of the possible association between data transmissions carried by QoS flows. Therefore, the base station can only know the requirements of a single data transmission itself, such that the resources allocated to the user equipment cannot meet the requirement that there is an association between data transmissions.

SUMMARY

A brief summary of the present disclosure is given below to provide a basic understanding in some aspects of the present disclosure. However, it should be understood that this summary is not an exhaustive overview of the present disclosure. It is not intended to determine key or important parts of the present disclosure, nor is it intended to limit the scope of the present disclosure. An object of the summary is only to present some concepts on the present disclosure in a simplified form, as a preface of detailed description given later.

In view of the above problems, an electronic device, a communication method, and a non-transient computer readable storage medium are provided according to an object of at least one aspect of the present disclosure, which can use association information to indicate an association relationship between data transmissions of user equipment, such that a base station can allocate transmission resources for the user equipment based on the association information, so as to optimize the process of allocating resources for the user equipment by the base station.

According to one aspect of the present disclosure, an electronic device is provided. The electronic device includes a processing circuit configured to: generate association information for a first data transmission of a first user equipment, where the association information indicates an association relationship between the first data transmission and a second data transmission of the first user equipment or a second user equipment; and send the association information together with QoS parameters of a QoS flow carrying the first data transmission to a base station side device, such that the base station side device allocates transmission resources for the first data transmission and/or the second data transmission based on the association information.

According to another aspect of the present disclosure, an electronic device is further provided. The electronic device includes a processing circuit configured to: receive association information for a first data transmission of a first user equipment that is sent together with QoS parameters of a QoS flow carrying the first data transmission, where the association information indicates an association relationship between the first data transmission and a second data transmission of the first user equipment or a second user equipment; and allocate transmission resources for the first data transmission and/or the second data transmission based on the association information.

According to yet another aspect of the present disclosure, a communication method is further provided. The method includes: generating association information for a first data transmission of a first user equipment, where the association information indicates an association relationship between the first data transmission and a second data transmission of the first user equipment or a second user equipment; and sending the association information together with QoS parameters of a QoS flow carrying the first data transmission to a base station side device, such that the base station side device allocates transmission resources for the first data transmission and/or the second data transmission based on the association information.

According to yet another aspect of the present disclosure, a communication method is further provided. The method includes: receiving association information for a first data transmission of a first user equipment that is sent together with QoS parameters of a QoS flow carrying the first data transmission, where the association information indicates an association relationship between the first data transmission and a second data transmission of the first user equipment or a second user equipment; and allocating transmission resources for the first data transmission and/or the second data transmission based on the association information.

According to another aspect of the present disclosure, a non-transitory computer readable storage medium storing executable instructions is also provided. The executable instructions, when being executed by a processor, cause the processor to perform the above communication method or functions of the electronic device.

According to other aspects of the present disclosure, there are further provided computer program codes and computer program products for implementing the above method according to the present disclosure.

According to at least one aspect of the embodiment of the present disclosure, the association information provided together with the QoS parameters of the QoS flow carrying the data transmission of the user equipment can be used to indicate the association relationship between data transmissions, such that the base station can allocate transmission resources for the user equipment based on the association information, so as to optimize the process of allocating resources for the user equipment by the base station.

Other aspects of the embodiments of the present disclosure are set forth in the following description, in which preferred embodiments for fully disclosing the embodiments of the present disclosure are described in detail without being limited thereto.

BRIEF DESCRIPTION OF THE DRAWINGS

The drawings are only used for illustrating the selected embodiments rather than all possible implementations, and are not intended to limit the scope of the present disclosure. In the drawings.

Figure 1:
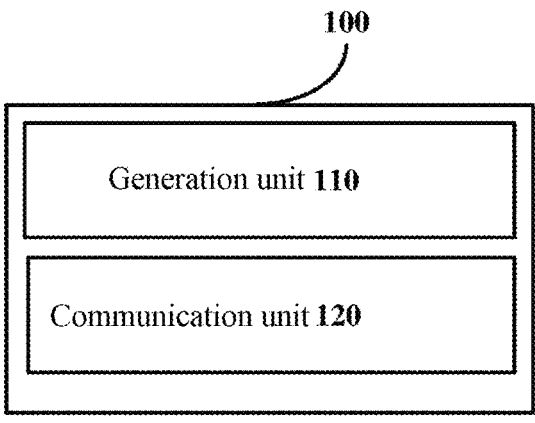
FIG. 1 is a block diagram showing a configuration example of an electronic device according to a first embodiment of the present disclosure.

Although the present disclosure is easily subjected to various modifications and replacements, specific embodiments of the present disclosure, as examples, are shown in the drawings and described in detail here. However, it should be understood that, the description of specific embodiments here is not intended to limit the present disclosure to the disclosed specific forms. On the contrary, the purpose of the present disclosure is to cover all modifications, equivalents and replacements that fall within the spirit and scope of the present disclosure. It should be noted that throughout the several drawings, corresponding parts are indicated by corresponding reference numerals.

DETAILED DESCRIPTION OF THE EMBODIMENTS

Examples of the present disclosure are fully described with reference to the drawings. The following description is merely exemplary and is not intended to limit the present disclosure and an application or use.

Exemplary embodiments are provided, such that the present disclosure becomes thorough and fully convey the scope of the present disclosure to those skilled in the art. Examples of specific components, apparatus, methods and other specific details are set forth to provide detailed understanding of embodiments of the present disclosure. It will be apparent to those skilled in the art that exemplary embodiments may be implemented in many different forms without the use of specific details, and should not be construed as limiting the scope of the present disclosure. In some exemplary embodiments, well-known processes, well-known structures, and well-known technologies are not described in detail.

Description is made in the following order:

1. Overview
2. Configuration example of electronic device according to a first embodiment
    2.1 Configuration example
    2.2 Example of association relationship
3. Configuration example of electronic device according to a second embodiment
    3.1 Configuration example
    3.2 Example of allocating transmission resources
    3.3 Example of signaling interaction
4. Method embodiment
5. Application example

1. Overview

As mentioned above, in the existing QoS mechanism, though both the user equipment and the core network device may provide the base station with the QoS parameters of the QoS flow that carries the data transmission of the user equipment, these parameters are only limited to indicate the requirements such as the delay and the packet loss rate, without consideration of the possible association between data transmissions carried by one or more QoS flows. Therefore, the resources allocated by the base station to the user equipment based on such QoS parameters cannot meet the requirement of association between data transmissions.

According to the present disclosure, an electronic device in a wireless communication system, a wireless communication method executed by the electronic device in the wireless communication system, and a computer readable storage medium for such a scenario are provided, such that a base station can allocate resources for user equipment based on the association relationship between data transmissions carried by QoS flows, so as to optimize the process of allocating resources for the user equipment by the base station.

The wireless communication system according to the present disclosure may be a 5G NR (New Radio) communication system. In addition, the wireless communication system may include scenarios such as D2D (Device to Device) communication and V2X communication.

The electronic device capable of providing association information indicating the association relationship according to a first embodiment of the present disclosure may be a user equipment or a core network device. As an example, the user equipment according to the present disclosure may be a mobile terminal (such as a smartphone, a tablet personal computer (PC), a notebook PC, a portable game terminal, a wearable device such as a smart watch, a portable/dongle mobile router and a digital camera apparatus) or an in-vehicle terminal (such as a vehicle navigation device). The user equipment may also be implemented as a terminal that performs machine-to-machine (M2M) communication (also referred to as a machine type communication (MTC) terminal). In addition, the user equipment may be a wireless communication module (such as an integrated circuit module including a single wafer) installed on each of the terminals described above. The user equipment according to the present disclosure may be located in a vehicle as an independent device or may be integrated into the vehicle.

In addition, the electronic device that may allocate transmission resources to the user equipment based on the association information according to a second embodiment of the present disclosure may be a base station device, such as an eNB or a gNB (a base station in the 5th generation communication system).

In the present disclosure, the services carried by the QoS flow may be a data service of D2D communication between user equipment, or a data service between user equipment and a network side device. The embodiments of the present disclosure are not particularly limited in this respect.

2. Configuration Example of Electronic Device According to a First Embodiment

[2.1 Configuration Example]

FIG. 1 is a block diagram showing a configuration example of an electronic device according to a first embodiment of the present disclosure.

As shown in FIG. 1, the electronic device may include a generation unit 110 and a communication unit 120.

Here, each unit of the electronic device 100 may be included in a processing circuitry. It should be noted that, the electronic device 100 may include one or more processing circuitry. Further, the processing circuitry may include various discrete functional units for performing various functions and/or operations. It should be noted that these functional units may be physical entities or logical entities, and units with different names may be implemented by a same physical entity.

As described above, the electronic device 100 according to the first embodiment may be a user equipment or a core network device. Hereinafter, unless otherwise specified, the functions or configurations of the electronic device 100 that are applicable to the user equipment and the core network device will be uniformly described, and the example functions or processes that are specifically applicable to user equipment or the core network device are described only when necessary.

According to an embodiment of the present disclosure, for example, the generation unit 110 of the electronic device 100 may generate association information for a first data transmission of a first user equipment, where the association information indicates an association relationship between the first data transmission and a second data transmission of the first user equipment or a second user equipment. Here, the first data transmission and the second data transmission may be data transmission performed by a corresponding user equipment via various communications, for example but not limited to a data transmission with a network side device, a data transmission with another user equipment via direct communication, and so on. In addition, the number of the second user equipment, the second data transmission and the association relationship involved may be one or more respectively. In other words, the association information for the first data transmission may indicate one or more association relationships between the first data transmission of the first user equipment and one or more other data transmissions of one or more user equipment (including the first user equipment itself). For convenience of description, a scenario in which the association information indicates one association relationship between the first data transmission and one second data transmission is described below, and may be similarly applied to a scenario in which the association information indicates more association relationships involved by the first data transmission.

According to an embodiment of the present disclosure, the communication unit 120 of the electronic device 100 may send the association information generated by the generation unit 110 together with QoS parameters of a QoS flow carrying the first data transmission to a base station side device, such that the base station side device may allocate transmission resources for the first data transmission and/or the second data transmission based on the association information. As an example, the association information may be sent through an extended QoS parameter/field in a QoS profile of the QoS flow carrying the first data transmission. In other words, the association information for the first data transmission may be in the form of the extended QoS parameter/field and included, together with the existing QoS parameters, in the QoS profile (QoS brief description) of the QoS flow carrying the first data transmission.

Here, in a case that the electronic device 100 is implemented as a user equipment, the user equipment itself may serve as a first user equipment. That is, the electronic device

100 generates association information for a first data transmission of the electronic device 100, for example, via the generation unit 110.

As an example, in this case, the association relationship indicated by the association information may be, for example, an association relationship between the first data transmission and the second data transmission of the first user equipment itself, and the first data transmission and the second data transmission may be respectively carried by the first QoS flow and the second QoS flow, may both be carried by the first QoS flow but belong to different data services, or may both be carried by the first QoS flow and belong to the same data service but include different data packets.

For example, the generation unit 110 may determine an association relationship between the first data transmission and the second data transmission based on the transmission requirements of the first data transmission and the transmission requirements of the first data transmission and the second data transmission, and generate association information indicating the association relationship accordingly. For example, the generation unit 110 may determine specific requirements of the first data transmission and the second data transmission through the application layer of the electronic device (the first user equipment), for example but not limited to the specific requirements of the data services to which the first data transmission and the second data transmission belong, the specific requirements of the QoS flows carrying these data services and so on, so as to determine the association relationship between these transmissions. In addition, the generation unit 110 may further determine the specific requirements of the first data transmission and the second data transmission by deploying the application data analysis function in the lower layer (NAS (Non-Access Stratum) layer/AS (Access Stratum) layer) of the electronic device (the first user equipment) or by subscribing to the data analysis function on the network side, so as to determine the association relationship between these transmissions.

Furthermore, in a case that the electronic device 100 is implemented as a core network device, the electronic device 100 may generate association information for the first data transmission of the first user equipment, for example, via the generation unit 110.

The association information generated by the electronic device implemented as a core network device may be similar to the association relationship generated by the electronic device as a first user equipment itself. In addition, the association relationship generated by the electronic device implemented as the core network device may also, for example, indicate an association relationship between the first data transmission of the first user equipment and the second data transmission of the second user equipment.

For example, the generation unit 110 may determine an association relationship between the first data transmission and the second data transmission based on transmission requirements of the first data transmission of the first user equipment and transmission requirements of the second data transmission of the first user equipment or the second user equipment, and generate association information indicating the association relationship accordingly. For example, the generation unit 110 may determine the association relationship between the first data transmission and the second data transmission based on the specific requirements of the service information related to the first data transmission and the second data transmission provided by the PCF of the electronic device 100 (a core network device) according to AF (for example but not limited to the requirements that the data services of the applications to which the first data transmission and the second data transmission belong are associated each other), the strategy of the operator, and the like.

No matter the electronic device 100 is implemented as a user equipment or a core network device, the association relationship determined by the electronic device 100 via the generation unit 110 may include, for example, but not limited to, one or more of the following types: synchronization association, which indicates that the first data transmission and the second data transmission are required to be synchronized; switchable association, which indicates that the first data transmission and the second data transmission may be switched with respect to each other (for example, the first data transmission is performed under certain conditions and the second data transmission is performed under other conditions); trigger association, which indicates that the first data transmission and the second data transmission are required to be performed in such a way that one of the first data transmission and the second data transmission triggers the other; complementary/similar change association, which indicates that the change trends of transmission requirements of the first data transmission and the second data transmission will be "complementary" (opposite) or similar; and so on. Further specific example will be described later in the example section of the association relationship.

The generation unit 110 may generate association information indicating the association relationship based on the determined association relationship, and the communication unit 110 may send the association information together with QoS parameters of a QoS flow carrying the first data transmission to a base station side device. In other words, the association information generated by the generation unit 110/sent by the communication unit 110 has a form that is suitable for transmission together with the QoS parameters of the QoS flow. Preferably, the association information may be in a form of extended QoS parameters/fields and included, together with the existing QoS parameters, in the QoS profile of the QoS flow carrying the first data transmission.

In a preferred embodiment, the association information may include an association object ID (identifier) for indicating an association object in the association relationship of the first data transmission (i.e., the second data transmission).

As an example, each association object ID may include one or more of the following fields: a UE ID field for indicating a UE (user equipment) to which the second data transmission belongs, which may use, for example, an application layer ID of the UE, a fixed ID of the UE (such as IMEI (International Mobile Equipment Identity), IMSI (International Mobile Subscriber Identification Number)), and a temporary identifier assigned to the UE by the core network (for example, SUPI (Subscription Permanent Identifier), GUTI (Globally Unique Temporary Identifier), 5G-GUTI (5G-Globally Unique Temporary Identifier), TMIS (Temporary Mobile Subscriber Identity), 5G-S-TMSI (5G-S-Temporary Mobile Subscriber Identity)), and so on; a QoS ID field for indicating a QoS flow carrying the second data transmission, which may use, for example, the identifier of the QoS flow (for example, QFI (QoS Flow Identifier) and PQFI/PFI (PC5 QoS flow identifier)); an application ID field for indicating an application to which the second data transmission belongs (such as the application ID of WeChat, and so on), which may use, for example, ID of the application; a data packet association ID field, which may be used, for example, to identify a data packet included in the second data transmission.

In practical applications, depending on an association range of the association relationship and granularity of the associated data transmission, the association object ID may have different forms, for example, including only necessary parts in the above-described fields. Alternatively, the association object ID may include all the above-described fields regardless of the association range of the association relationship and the granularity of the associated data transmission, but reserved bits are used for unnecessary fields.

It will be briefly described below, for several cases of example association range/granularity, corresponding forms that the association object ID included in the association information of the QoS profile of the QoS flow carrying the first data transmission may take.

(1) A case where the first data transmission and the second data transmission belong to different QoS flows of different UEs and the association granularity is a QoS flow.

In this case, in the association information of the QoS profile of the QoS flow carrying the first data transmission, the association object ID may include a UE ID field and a QoS ID field related to the second data transmission. The application ID field or the data packet association ID field may be omitted or may be a reserved bit to indicate that the association object includes all applications and data packets in the QoS flow indicated by the QoS ID field.

(2) A case where the first data transmission and the second data transmission belong to different QoS flows of the same UE and the association granularity is a QoS flow.

In this case, in the association information of the QoS profile of the QoS flow carrying the first data transmission, the association object ID may include a QoS ID of the QoS flow related to the second data transmission. The UE ID field may be omitted or may be a reserved bit or UE ID of the first user equipment itself. Furthermore, similar to the case (1), the application ID field or data packet association ID field may be omitted or may be a reserved bit.

(3) A case where the first data transmission and the second data transmission belong to different data services within the same QoS flow and the association granularity is data services.

In this case, in the association information of the QoS profile of the QoS flow that carries both the first data transmission and the second data transmission, the association object ID may include an application ID field indicating ID of an application 1 to which the first data transmission belongs and ID of an application 2 to which the second data transmission belongs. The QoS ID field may be omitted or be a reserved bit or ID of this QoS flow. Furthermore, the UE ID field may be omitted or may be a reserved bit or UE ID of the first user equipment itself. The data packet association ID field may be omitted or be a reserved bit.

In this case, the first data transmission and the second data transmission may share the same association information, that is, association information including the above-described the association object ID is carried by the QoS profile of one QoS flow.

In this case, the generation unit 110 may, for example, mark data packets of each application with an application ID corresponding to this application, that is, all data packets of application 1 are marked with application ID1, and all data packets of application 2 are marked with application ID2.

(4) A case where the first data transmission and the second data transmission belong to different data packets of the same data service within the same QoS flow (i.e., the association granularity is data packets).

In this case, a form of the association type ID may be similar to that in the case (3), the difference is that in the association information of the QoS profile of the QoS flow that carries both the first data transmission and the second data transmission, mandatory fields that are required to be included in the association type ID may be, for example, the data packet association ID field (ID1 of a data packet used for the first data transmission and ID2 of a data packet used for the first data transmission) instead of the application ID field.

In this case, the generation unit 110 may, for example, mark data packets of each data transmission with a data packet association ID corresponding to this data transmission, that is, all data packets of the first data transmission are marked with data packet association ID1, and all data packets of the second data transmission are marked with data packet association ID2.

One or more items in the above-described example cases (1) to (4) may be combined appropriately. For example, the example cases (1) and (2) each may be combined with the association granularity in the example case (3) or (4), and the example case (3) may be combined with the association granularity in example (4) to refine the association granularity to a degree of application or data packet in each association range. In the combined example, the unnecessary fields may also be implemented with reserved bits.

In one preferred embodiment, in addition to the above-described association object ID, association information for the first data transmission, for example, included in the QoS profile of the QoS flow carrying the first data transmission, may also include an association type ID as an example of association type information, which is used to indicate an association type to which the association relationship between the first data transmission and the second data transmission belongs. Here, the association type may include one or more of synchronization association, switchable association, trigger association, complementary change association, similar change association and coexistence association.

Further preferably, association information for the first data transmission, for example, included in the QoS profile of the QoS flow carrying the first data transmission, may also include optional association parameter(s) related to the association type between the first data transmission and the second data transmission. The association parameter(s) may be used to indicate transmission requirements of association relationship of the corresponding association type.

In a first example, for association relationship in a case of synchronization association, the association information may include synchronization association parameters, which are used to indicate a time range and granularity of synchronous transmission between the first data transmission and the second data transmission. For example, for a range of synchronous transmission, synchronization association parameters may indicate a range of data packets that are required to be synchronized with the second data transmission in the first data transmission, such as all or partial data packets. For the former case (the range of synchronous transmission is all data), the synchronization association parameters may include, for example, a complete synchronization identifier for indicating complete synchronization; for the latter case (the range of synchronous transmission is partial data packets), the synchronization association parameters may include a data packet identifier for indicating data packets that are required to be synchronized in the first data transmission. Furthermore, alternatively, the synchronization association parameters may also indicate, for example, frequency and typical size of data packets of the first data transmission.

In a second example, for association relationship in a case of the switchable association, the association information may include a switching association parameter, which is used to indicate a data level corresponding to the first data transmission. As an example, a data level corresponding to the first data transmission may be indicated by a data packet size of the first data transmission, a frequency and/or a throughput of data transmission, and so on.

In a third example, for association relation in a case of trigger association, the association information may include a trigger association parameter, which is used to indicate a trigger delay between the first data transmission and the second data transmission. Furthermore, in this case, the association information may explicitly or implicitly indicate a trigger/triggered party in the first data transmission and the second data transmission.

As an example of explicitly indicating the trigger/triggered party, the association type ID of the association information for the first data transmission may include a trigger/triggered party identification field of an additional 1 bit, for example, to indicate a trigger when a value of this field is 1 and a triggered party when a value of this field is 0. Alternatively, in the trigger association parameter of the association information for the first data transmission, a trigger delay field may be made to include an additional positive/negative label (+/−) in addition to time information as the delay, where + label represents the trigger and − label represents the triggered party. On the other hand, as an example of implicitly indicating the trigger/triggered party, the trigger association parameter for indicating the trigger delay may be included only in the association information of the trigger. That is, for the first data transmission, only when the first data transmission is the trigger in the trigger association, the trigger association parameter for indicating the trigger delay may be included in the association information included in the QoS profile of the QoS flow carrying the first data transmission (but not the second data transmission).

Furthermore, regardless of whether the first data transmission is a trigger or a triggered party in trigger association, association information of the first data transmission may include optional additional trigger association parameters for indicating a ratio of the packet size of the trigger to the packet/data transmission throughput of the triggered party, a typical packet size of the triggered party, and so on.

In a fourth example, for association information in a case of complementary/similar change association, the association information may include a complementary/similar change association parameter, which is used to indicate a transmission requirement of the first data transmission that has a complementary/similar change trend to the transmission requirement of the second data transmission. As an example, the transmission requirement of the first data transmission that has a complementary/similar change trend to the transmission requirement the second data transmission may include a transmission throughput, a packet size, a frequency of data transmission and/or delay requirements of the first data transmission, and so on.

Optionally, the complementary/similar change association parameter may further include a change coefficient, which is used to indicate a relationship between a change amount of the transmission requirement such as a throughput of the first data transmission and a change amount of the corresponding transmission requirement of the second data transmission. For example, for the complementary change association, the change coefficient in the complementary change association parameter may be, for example, a properly set negative change coefficient (such as −0.5, −1.0, −2.0, and so on), indicating that an amount by which the transmission throughput of the second data transmission is required to be changed (increased/decreased) is a product of multiplying the change amount of the transmission throughput of the first data transmission by the negative coefficient, so as to achieve the opposite change. For similar change association, the change coefficient in the similar change association parameter may be, for example, a properly set positive change coefficient (such as 0.5, 1.0, 2.0, and so on), indicating that an amount by which the transmission throughput of the second data transmission is required to be changed (increased/decreased) is a product of multiplying the change amount of the transmission throughput of the first data transmission by the positive coefficient, so as to achieve a similar change.

Furthermore, optionally, the complementary change association parameter may further include an overall requirement parameter, which is used to indicate an overall requirement of the transmission requirement in which the first data transmission and the second data transmission have complementary change trends (for example, an overall requirement of the QoS parameter of the transmission requirement with complementary change trends), for example but not limited to an overall delay requirement and an overall transmission throughput of the first data transmission and the second data transmission. For example, if the delay requirements of the first data transmission and the second data transmission have complementary change trends, the complementary change association parameter may include an overall requirement parameter indicating the overall delay requirement of the first data transmission and the second data transmission, which may be for example Xms (milliseconds).

An example in which the association information includes association parameters related to the association type is described above. However, the association parameter is an optional field in the association information, and the association information may include only the association type and does not include the above association parameters. For example, for association relationship in a case of coexistence association, the association information may only include an association type indicating an coexistence association between the first data transmission and the second data transmission (to indicate that when one data transmission is not in progress, the other data transmission is meaningless even if performed and thus it should not be performed, either), and does not include association parameters related to the association type.

According to this embodiment, the electronic device generates and provides the association information such as described above to the base station side device, such that the base station side device can get association relationship between different data transmissions and allocate transmission resources satisfying the association relationship for these data transmissions.

For example, in a case that the electronic device 100 is implemented as the first user equipment itself, optionally, the communication unit 120 may also receive resource information indicating transmission resources allocated for the first data transmission from the base station side device, and perform the first data transmission using the transmission resources indicated by the resource information. Next, examples of association relationship will be further described, wherein the association relationship can be determined and the association information thereof can be generated, for example, via the generation unit by the electronic device according to this embodiment.

[2.2 Example of Association Relationship]

(Example of Synchronization Association)

As an example of synchronization association, data transmission between two UEs performing machine learning such as federated/distributed machine learning may be considered.

Specifically, in machine learning methods such as federated learning/distributed learning/model split computing, the operations involved are distributed between one or more UEs and servers. These UEs and servers transmit/deliver intermediate operation results in the model training or the loaded model calculation process, through 5G. In federated/distributed learning, the intermediate operation results (gradient/loss, and so on) calculated by two UEs may be required to be sent to an edge computing server for the next operation. In order to enable efficient operation, the corresponding operation results are required to be sent to a same edge computing server as synchronously as possible (for example, synchronization at the second level, millisecond level, or even ns level).

The electronic device according to this embodiment may, for example, determine a synchronization association between data transmissions of intermediate operation results of the above-described two UEs, and generate association information which is used to indicate the synchronization association for each of the data transmissions.

As an example of synchronization association, examples of scenarios such as a concert, a home theater, and VR (Vitual Reality) may also be considered. In this example, there are input/output of data flows of multiple audio devices, video devices and tactile devices (for example, related data flows are collected in different devices and transferred to the same device for processing, and different data are sent to different devices). The data transmission between these devices requires strong time synchronization (for example, millisecond level), otherwise poor audiovisual sense will occur due to asynchronous sound and picture, for example.

The electronic device according to this embodiment may, for example, determine synchronization association between the respective data transmissions of the above-described devices, and generate association information which is used to indicate the synchronization association relationship for each of data transmissions, respectively.

(Example of Switchable Association)

As an example of switchable association, a case in which a first camera and a second camera with different resolutions (or other sensor modules) transmit respective data to a target UE through their respective communication modules and the target UE only requires one data flow may be considered. In this case, a first data transmission between the target UE and the first camera and a second data transmission between the target UE and the second camera may correspond to different data levels, and they are in switchable association with each other.

Furthermore, an example in a VR scenario may be considered, in which a host UE performs an image rendering operation and delivers the images to VR glasses worn by a user that has an ability to output video data of various resolutions/code rates/refresh rates and so on, and it may perform data transmission of video data of various specifications at different data levels. In this case, there is a switchable association between data transmissions of different data levels of the host UE.

The electronic device according to this embodiment may, for example, determine the switchable association between data transmissions of different data levels described above, and generate association information which is used to indicate the switchable relationship for each of data transmission, respectively.

(Example of Trigger Association)

As an example of trigger association, an example scenario of federated/distributed learning is considered. The front-end UE sends an intermediate calculation result to a back-end UE via the first data transmission, such that the back-end UE performs the subsequent operation. After completing the operation, the back-end UE feeds back a calculation result of the back-end UE (such as a result of image recognition, words recognized by voice, and so on) to the front-end UE through the second data transmission after a fixed or variable time delay.

The electronic device according to this embodiment may, for example, determine a trigger association between the first data transmission and the second data transmissions and generate association information which is used to indicate the trigger association for each of data transmissions.

(Example of Complementary Change Association)

As an example of complementary change association, an example scenario of federated/distributed learning is considered. Multiple computing UEs performs image rendering and provide a rendering result to a server, for example. In a case that the total amount of computing load carried by multiple UEs does not change much, transmission throughputs of respective data transmissions of the multiple UEs for providing rendering results to the server, for example, have complementary change trends.

As another example of complementary change association, a scenario is considered in which the first data transmission and the second data transmission are uplink data packets/flows and downlink data packets/flows for the same data service respectively, and the first data transmission and the second data transmission have a sequential relationship, for example, the first data transmission triggering the second data transmission. In this case, it is expected that an overall delay of data packets of the first data transmission and data packets of the second data transmission is Xms, that is, the overall delay from the beginning of the data packets of the first data transmission to the end of the data packets of the second data transmission is Xms. Thus, it may be considered that the delay requirements of the first data transmission and the second data transmission have complementary change trends. The electronic device according to this embodiment may, for example, determine complementary change association between the above-described data transmissions, and generate association information which is used to indicate the complementary change association for each of data transmissions, respectively.

(Example of Similar Change Association)

As an example of similar change association, an example of a VR scenario is considered, in which a host UE performs an image rendering operation for the same video content to deliver to VR glasses worn by the user, and generates corresponding tactile content data (such as force feedback, vibration feedback, temperature feedback, and so on). With the change of the scenario content (such as the game content changing from a static and gentle scenario to a fierce fighting scenario), transmission throughputs of two or more data transmissions involved in these different data services have similar change trends. An example of vehicle networking scenario may be also considered, in which when a Platooning service is performed between vehicle UEs, as the vehicle speed increases or a distance between vehicles decreases, data requirements such as shorter latency, more sensor data (clearer video, more accurate location information), higher data frequency and so on are required between vehicle UEs. In this case, two or more data transmissions involved in different data services related to fleet services (for example, data transmission of different data services sharing sensor data between vehicles UEs, data transmission of driving operation instructions of the head vehicle UE, and data transmission of a driving state of a vehicle UE) have similar change trends.

The electronic device according to this embodiment may, for example, determine a similar change association between two or more data transmissions in each of the above-described example scenarios, and generate association information which is used to indicate the similar change association for each of data transmissions, respectively.
(Example of Coexistence Association)

As an example of coexistence change association, a scenario in which a video stream is provided to a user is considered, in which a certain upper-layer application service provides a user with a first data transmission for an image of a video stream and a second data transmission for a sound of the video stream simultaneously. In this example scenario, the upper-layer application service may be supported only in a case that the first data transmission and the second data transmission are performed simultaneously (and optionally, the first data transmission and the second data transmission also meet or satisfy the corresponding QoS parameter requirements simultaneously); in a case that one data transmission is suspended/interrupted/stopped due to, for example, congestion/unavailability of communication resources/no service/link disconnection, the other data transmission is meaningless even if being continuously performed.

The electronic device according to this embodiment may, for example, determine a coexistence association between the first data transmission and the second data transmission in the above-described example scenario, and generate association information which is used to indicate the coexistence association for each of data transmissions, respectively.

3. Configuration Example of Electronic Device According to a Second Embodiment

[3.1 Configuration Example]

Corresponding to the configuration example of the electronic device according to the first embodiment described above, the configuration example of the electronic device according to the second embodiment of the embodiment of the present disclosure will be described in detail below, where the electronic device may be, for example, a base station side device such as a base station itself.

Figure 2:
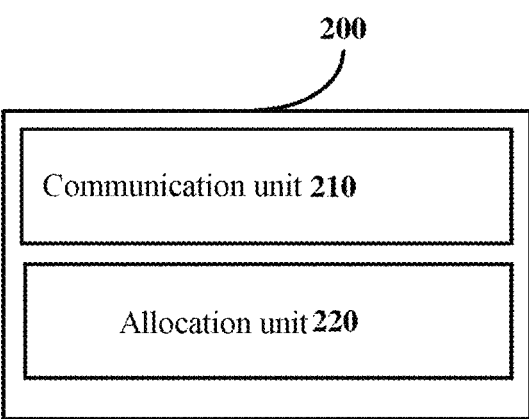
FIG. 2 is a block diagram showing a configuration example of an electronic device according to a second embodiment of the present disclosure.

FIG. 2 is a block diagram showing a configuration example of an electronic device according to a second embodiment of the present disclosure.

As shown in FIG. 2, the electronic device 200 may include a communication unit 110 and an allocation unit 220.

Here, each unit of the electronic device 100 may be included in a processing circuitry. It should be noted that, the electronic device 100 may include one or more processing circuitry. Further, the processing circuitry may include various discrete functional units for performing various functions and/or operations. It should be noted that these functional units may be physical entities or logical entities, and units with different names may be implemented by a same physical entity.

According to an embodiment of the present disclosure, for example, the communication unit 110 of the electronic device 200 may receive association information for a first data transmission of the first user equipment that is sent together with QoS parameters of a QoS flow carrying the first data transmission, where the association information indicates an association relationship between the first data transmission and a second data transmission of the first user equipment or a second user equipment. Here, the first data transmission and the second data transmission may be data transmission performed by a corresponding user equipment via various communications, for example but not limited to a data transmission with a network side device, a data transmission with another user equipment via direct communication, and so on. In addition, the number of the second user equipment, the second data transmission and the association relationship involved may be one or more respectively. In other words, the association information for the first data transmission received by the electronic device 200 may indicate one or more association relationships between the first data transmission of the first user equipment and one or more other data transmissions of one or more user equipment (including the first user equipment itself). For convenience of description, a scenario in which the association information indicates one association relationship between the first data transmission and one second data transmission is described below, and it may be similarly applied to a scenario in which the association information indicates more association relationships involved by the first data transmission.

According to an embodiment of the present disclosure, the association information that the electronic device 200 may receive via the communication unit 210 may be sent through an extended QoS parameter/field in a QoS profile of a QoS flow carrying the first data transmission. In other words, the association information received by the electronic device 200 for the first data transmission may be in the form of the extended QoS parameter/field and included, together with the existing QoS parameters, in the QoS profile of the QoS flow carrying the first data transmission.

As an example, the association relationship indicated by the association information received by the electronic device 200 may be, for example, an association relationship between the first data transmission and the second data transmission of the first user equipment itself, and the first data transmission and the second data transmission may be respectively carried by the first QoS flow and the second QoS flow, may both be carried by the first QoS flow but belong to different data services, or may both be carried by the first QoS flow and belong to the same data service but include different data packets.

Furthermore, the association relationship indicated by the association information received by the electronic device 200 may also, for example, indicate the association relationship between the first data transmission of the first user equipment and the second data transmission of the second user equipment.

The allocation unit 220 of the electronic device 200 may allocate transmission resources for the first data transmission and/or the second data transmission based on the association information received via the communication unit 210. The allocated transmission resources may, for example, satisfy the association relationship indicated by the association information. In a case that the first data transmission and the second data transmission belong to different user equipment, the electronic device 200 may allocate transmission resources for corresponding data transmission to the first user equipment and/or the second user equipment.

For example, no matter the association relationship received by the electronic device 200 indicates the association relationship between the first data transmission and the second data transmission of the same user equipment or the association relationship between the first data transmission and the second data transmission of different user equipment, examples of the association relationship may include, but not limited to, one or more of the following types: synchronization association, which indicates that the first data transmission and the second data transmission are required to be synchronized; switchable association, which indicates that the first data transmission and the second data transmission may be switched with respect to each other (for example, the first data transmission is performed under certain conditions and the second data transmission is performed under other conditions); trigger association, which indicates that the first data transmission and the second data transmission are required to be performed in such a way that one of the first data transmission and the second data transmission triggers the other; complementary/similar change association, which indicates that the change trend of transmission requirements of the first data transmission and the second data transmission will be "complementary" (opposite) or similar; and so on. Further specific examples of the above-described relationship may refer to the examples described above with respect to the first embodiment, which are not repeated here.

The association information received by the electronic device 200 may, for example, indicate an association relationship such as the above-described example type, such that the electronic device 200 may, for example, allocate transmission resources for the first data transmission and/or the second data transmission based on the association type of the association relationship.

In one preferred embodiment, the association information received by the electronic device 200 may include ID (identifier) of an association object, which is used to indicate an association object in the association relationship of the first data transmission (i.e., the second data transmission).

As an example, each association object ID may include one or more of the following fields: a UE ID field for indicating a UE (user equipment) to which the second data transmission belongs, which may use, for example, an application layer ID of the UE and so on; a QoS ID field for indicating a QoS flow carrying the second data transmission, which may use, for example, the identifier of the QoS flow; an application ID field for indicating an application to which the second data transmission belongs (such as the application of WeChat, and so on), which may use, for example, ID of the application; a data packet association ID field, which may be used, for example, to identify a data packet included in the second data transmission.

In practical applications, depending on an association range of the association relationship and granularity of the associated data transmission, the association object ID may have different forms, for example, including only necessary parts in the above-described fields. Alternatively, the association object ID may include all the above-described fields regardless of the association range of the association relationship and the granularity of the associated data transmission, but reserved bits are used for unnecessary fields. The specific forms of the association object ID may be, for example, the forms described in the example cases (1) to (4)

described above with respect to the first embodiment or an appropriate combination thereof, which are not repeated here.

In one preferred embodiment, in addition to the above-described association object ID, the association information for the first data transmission received by the electronic device 200 that is, for example, included in the QoS profile of the QoS flow carrying the first data transmission, may also include an association type ID as an example of association type information, to indicate an association type to which the association relationship between the first data transmission and the second data transmission belongs. Here, the association types may include one or more of synchronization association, switchable association, trigger association, complementary change association, similar change association and coexistence association. Further preferably, the association information for the first data transmission received by the electronic device 200 that is, for example, included in the QoS profile of the QoS flow carrying the first data transmission, may also include optional association parameters related to the association type between the first data transmission and the second data transmission. The association parameters may be used to indicate the transmission requirements of association relationship of the corresponding association type. The allocation unit of the electronic device 200 may, for example, allocate corresponding transmission resources for the first data transmission and/or the second data transmission based on the requirements of the association type and optional association parameters in the association information. Here, when allocating transmission resources, the allocation unit 200 preferably also considers the existing QoS parameters in the QoS profile of the QoS flow carrying the first data transmission that include the association information and/or the existing QoS parameters in the QoS profile of the QoS flow carrying the second data transmission that include the association information, so as to allocate transmission resources for the first data transmission and/or the second data transmission that meet both the requirements of the association parameters and these existing QoS parameters. Such existing QoS parameters may include, for example, but are not limited to, the following QoS parameters: PQI/5QI (PC5 QoS Identifier/5G QoS Identifier), which may be mapped to a set of characteristics of PC5/5G QoS, such as PDB (Packet Delay Budget), QoS Priority Level, PER (Packet Error Rate); and/or GFBR/MFBR (Guaranteed Flow Bit Rate/Maximum Flow Bit Rate) and so on.

[3.2 Example of Allocating Transmission Resources]

Hereinafter, further details of allocating, by the allocation unit of the electronic device 200, corresponding transmission resources for the first data transmission and/or the second data transmission based on the association type in the association information and optional association parameters will be described with specific examples as appropriate.

First Example of Allocating Transmission Resources

If association information received by the electronic device 200 that is, for example, included in the QoS profile of the QoS flow carrying the first data transmission indicates an association relationship of synchronization association, the association information for the first data transmission (first synchronization association information) may include synchronization association parameters, which are used to indicate a time range and granularity of synchronous transmission to be implemented by the first data transmission with respect to the second data transmission. For example, for a range of synchronous transmission, synchronization association parameters may indicate a range of data packets that are required to be synchronized with the second data transmission in the first data transmission, such as all or partial data packets. For the former case (the range of synchronous transmission is all data), the synchronization association parameters may include, for example, a complete synchronization identifier for indicating complete synchronization; for the latter case (the range of synchronous transmission is partial data packets), the synchronization association parameters may include a data packet identifier for indicating data packets that are required to be synchronized in the first data transmission. Furthermore, alternatively, the synchronization association parameters may also indicate, for example, a frequency and a typical size of data packets of the first data transmission. Corresponding to the above-described first synchronization association information, the electronic device 200 may also receive the association information for the second data transmission (second synchronization association information) that is, for example, included in the QoS profile of the QoS flow carrying the second data transmission (i.e., an association object indicated in the first synchronization association information).

Accordingly, for example, after receiving the first synchronization association information and the second synchronization association information in the QoS profile of the QoS flows carrying the first data transmission and the second data transmissions, the electronic device 200 may allocate, via the allocation unit 220, transmission resources for the first data transmission and the second data transmission based on the synchronization association parameters included in the first synchronization association information and the second synchronization association information, which transmission resources meet the requirements of the time range and the granularity of synchronous transmission indicated by the synchronization association parameters. The allocated transmission resources preferably also meet the requirements of the existing QoS parameters in the QoS profile of the QoS flows carrying the first data transmission and the second data transmission. Optionally, the allocation unit 220 may also optimize allocation for the synchronous transmission resources based on the frequency and the size of data packets indicated by synchronization association parameters.

Figure 3:
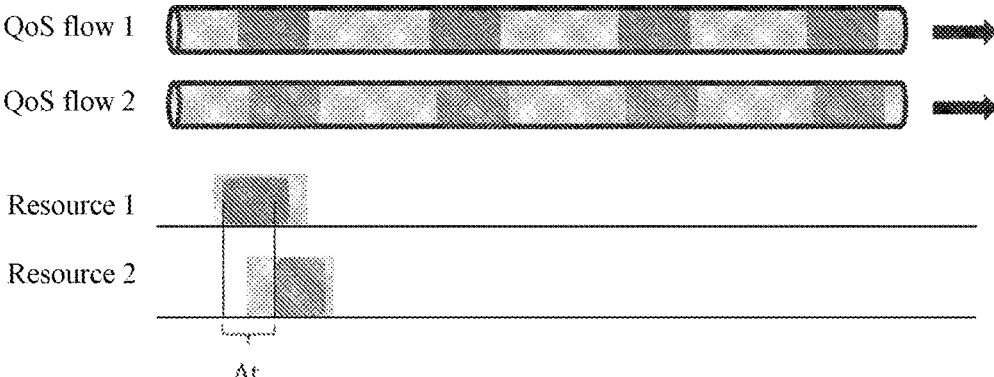
FIG. 3 is an explanatory diagram for explaining an example of allocating transmission resources for data transmissions with synchronization association.

FIG. 3 is an explanatory diagram for explaining an example of allocating transmission resources for data transmission with synchronization association. The upper side of FIG. 3 schematically shows a QoS flow 1 and a QoS flow 2 that carry a first data transmission and a second data transmission (each involving multiple times of data transmissions, such as multiple data packets) with synchronization association, and the right arrow indicates the transmission direction (sending).

The lower side of FIG. 3 schematically shows Resource 1 and Resource 2 allocated by the electronic device 200 for a first data transmission and a second data transmission, where the allocated transmission time windows are shown with a light background, and data transmission is performed once (such as the transmission of a data packet) in each time window. As shown in the lower side of FIG. 3, the transmission time windows of Resource 1 and Resource 2 allocated by the electronic device 200 for data packets with synchronization requirements in the first data transmission and the second data transmission (data packets within the time range of synchronous transmission) are as close as possible to each other in the time domain, so as to meet the requirements of synchronization granularity. For example, in this example, a difference Δt between the data transmission start times in the corresponding transmission time windows is required to be less than or equal to the granularity of synchronous transmission.

Second Example of Allocating Transmission Resources

If association information received by the electronic device 200 that is, for example, included in the QoS profile of the QoS flow carrying the first data transmission indicates an association relationship of switchable association, the association information for the first data transmission (first switching association information) may include a switching association parameter for indicating a data level corresponding to the first data transmission. As an example, the data level may be indicated by a packet size, a frequency and/or a throughput of data transmission of the first data transmission, and so on. Furthermore, corresponding to the above-described first switching association information, the electronic device 200 may also receive association information for the second data transmission (second switching association information) that is, for example, included in the QoS profile of the QoS flow carrying the second data transmission (i.e., an association object indicated in the first switching association information).

As an example, after receiving the first switching association information and the second switching association information in the QoS profiles of the QoS flows carrying, for example, the first data transmission and the second data transmission, the allocation unit 220 of the electronic device 200 may, for example, first allocate initial transmission resources for the first data transmission or the second data transmission regardless of the switching association information. The allocated transmission resources preferably meet the requirements of the existing QoS parameters in the QoS profile of the QoS flow carrying the first data transmission or the second data transmission.

After that, the allocation unit 220 may know the transmission quality of the first data transmission and the second data transmission through its own monitoring or by other means (for example, knowing the transmission quality from the core network device), and/or determine the available transmission resources that can be allocated to the first data transmission and the second data transmission. In a case that a data level, determined based on the transmission quality of and/or available transmission resources for the first data transmission or the second data transmission, corresponds to a data level indicated by the switching association parameter included in the first switching association information, the allocation unit 220 may allocate transmission resources of the indicated data level for the first data transmission. Similarly, in a case that the determined data level corresponds to a data level indicated by the switching association parameters included in the second switching association information, the allocation unit 220 may allocate transmission resources of the indicated data level for the second data transmission. The allocated transmission resources preferably also meet the requirements of the existing QoS parameters in the QoS profile of the QoS flow carrying the data transmission. Alternatively, the allocation unit 220 may generate information for indicating the determined data level and provide the information to the user equipment for the corresponding data transmission via the communication unit 210.

With the above-described resource allocation method, transmission resources of a data level corresponding to the current transmission conditions/available transmission resources may be allocated to the corresponding one of the first data transmission or second data transmission, such that at a given time, for example, only an appropriate one of the first data transmission and second data transmission (for example, the data transmission of the highest level that can be satisfied) can be performed.

As an example, the allocation unit 220 may monitor the transmission quality/transmission conditions of the first data transmission and the second data transmissions by itself, for example, by monitoring whether there is congestion within a current base station coverage range. The allocation unit 220 may, for example, determine that the transmission quality is degraded/transmission conditions are deteriorated in a case that congestion occurs, and/or determine that the transmission corresponding to the current data level cannot be continuously performed in a case that the transmission resources controlled by the base station are insufficient, and it may thus determine a lower data level (for example, a smaller data packet), and allocate transmission resources only for the data transmission corresponding to the smaller packet, and stop the allocation of transmission resources for the other data transmission. Alternatively, the transmission quality/transmission conditions/data levels of the first data transmission and the second data transmissions may be monitored or determined by a core network device, and the electronic device 200 may obtain information related to the transmission quality/transmission conditions/data levels of the first data transmission and the second data transmissions from the core network device through communication with the core network device, and perform subsequent processing accordingly, which is not described here.

Figure 4:
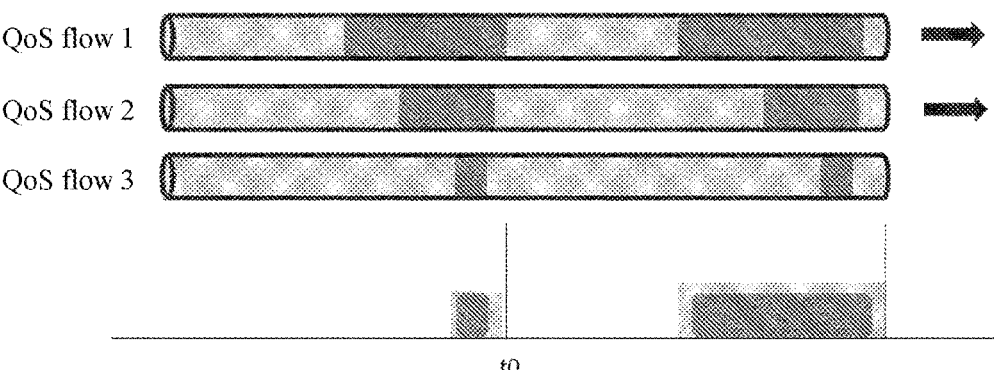
FIG. 4 is an explanatory diagram for explaining an example of allocating transmission resources for data transmissions with switchable association.

FIG. 4 is an explanatory diagram for explaining an example of allocating transmission resources for data transmissions with switchable association. The upper side of FIG. 4 schematically shows a QoS flow 1, a QoS flow 2 and a QoS flow 3 that carry three data transmissions (each involving multiple data packets) with switchable association, and the right arrow indicates the transmission direction (sending).

The lower side of FIG. 4 schematically shows resources allocated by the electronic device 200 for three data transmissions. As shown in the lower side of FIG. 4, for example, resources allocated for the three data transmissions are switched among different data transmissions, before and after the time when congestion occurs in the current base station coverage range, i.e., the time instant t0, wherein before the time instant t0, the resources are allocated for the data transmission carried by QoS flow 1 that corresponds to a maximum data level, and after the time instant t0, the resources are allocated for the data transmission carried by QoS flow 3 that corresponds to a minimum data level. In the example of FIG. 3, data flow of each of the data transmissions has a stable frequency, such that the base station can adjust the allocated communication resources in the non-time window of the transmission period.

Third Example of Allocating Transmission Resources

If association information received by the electronic device 200 that is, for example, included in the QoS profile of the QoS flow carrying the first data transmission indicates the association relationship of trigger association, the association information for the first data transmission (first trigger association information) may include a trigger association parameter, which is used to indicate a trigger delay between the first data transmission and the second data transmission. Furthermore, the first association information may explicitly or implicitly indicate a trigger/triggered party in the first data transmission and the second data transmission.

As an example of explicitly indicating the trigger/triggered party, the association type ID of the first association information may include a trigger/triggered party identification field of an additional 1 bit, for example, to indicate a trigger when a value of this field is 1 and to indicate a triggered party when a value of this field is 0. Alternatively, in the trigger association parameter of the first trigger association information, a trigger delay field may include an additional positive/negative label (+/−) in addition to time information as the delay, where + label represents the trigger and − label represents the triggered party. On the other hand, as an example of implicitly indicating the trigger/triggered party, the trigger association parameter for indicating the trigger delay may be included only in the first association information.

Furthermore, regardless of whether the first data transmission is a trigger or a triggered party in trigger association, the first trigger association information may include optional additional trigger association parameters for indicating a ratio of the packet size of the trigger to the packet/data transmission throughput of the triggered party, a typical packet size of the triggered party, and so on.

On the other hand, corresponding to the above-described first trigger association information, the electronic device 200 may also receive association information for the second data transmission (second trigger association information) that is, for example, included in the QoS profile of the QoS flow carrying the second data transmission (i.e., an association object indicated in the first trigger association information).

Accordingly, for example, after receiving the first trigger association information and/or second trigger association information in the QoS profile of the QoS flow carrying the first data transmission and/or second data transmission, the allocation unit 220 of the electronic device 200 may allocate, for the triggered party in the first data transmission and the second data transmission, transmission resources that involve a trigger delay indicated by the trigger association parameter with respect to the transmission time of the trigger in the first data transmission and the second data transmission. The allocated transmission resources preferably also meet the requirements of the existing QoS parameters in the QoS profile of the QoS flow carrying the triggered party. Preferably, the above-described allocation by the allocation unit 220 may be performed after receiving the trigger association information and monitoring that there is a triggering data packet transmitted on the QoS flow of the trigger. Furthermore, in a case that the received association information includes additional trigger association parameters (for example, indicating a ratio of a packet size of the trigger to a packet size of the triggered party, a typical packet size of the triggered party, and so on), the allocation unit 220 may also allocate resources for the triggered party based on the requirements of the additional trigger association parameters.

Figure 5:
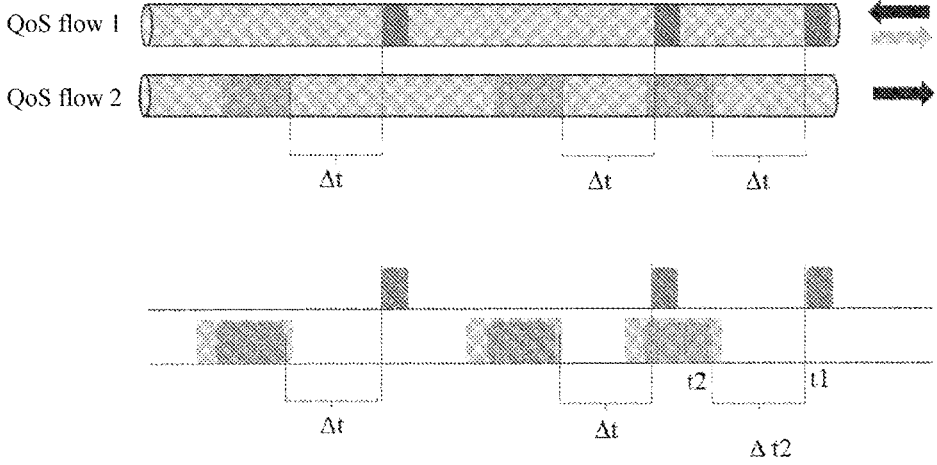
FIG. 5 is an explanatory diagram for explaining an example of allocating transmission resources for data transmissions with an association relationship of trigger association.

FIG. 5 is an explanatory diagram for explaining an example of allocating transmission resources for data transmissions with an association relationship of trigger association. The upper side of FIG. 5 schematically shows a QoS flow 1 and a QoS flow 2 that carry a first data transmission and a second data transmission (each involving multiple data packets) with trigger association, where the right arrow and the left arrow indicate the respective transmission directions (sending and reception), and there is a fixed or variable trigger delay Δt between the first data transmission and the second data transmission.

The lower side of FIG. 5 schematically shows transmission time of a data packet of a first data transmission (reception) as a trigger, and resources allocated by the electronic device 200 for a second data transmission (sending) as a triggered party. That is, the allocated transmission time windows are shown with a light background, and data transmission is performed once in each time window. As shown in the figure, in this example, the start time t2 of a time window for the resources allocated by the electronic device 200 for the data packet of the second data transmission as the triggered party is the transmission (reception) completion time t1 of the data packet of the first data transmission as the trigger plus the trigger delay Δt. That is, t2=t1+Δt.

Fourth Example of Allocating Transmission Resources

If association information received by the electronic device 200 that is, for example, included in the QoS profile of a QoS flow carrying a first data transmission indicates an association relationship of complementary/similar change association, the association information for the first data transmission (first complementary/similar change association information) may include complementary/similar change association parameters for indicating a transmission requirement of the first data transmission that has a complementary/similar change trend to the transmission requirement of the second data transmission. As an example, the transmission requirement of the first data transmission that has a complementary/similar change trend to the transmission requirement of the second data transmission may include a transmission throughput, a packet size, a frequency and/or delay requirements of data transmission of the first data transmission, and so on.

Optionally, the complementary/similar change association parameter may further include a change coefficient, which is used to indicate an association relationship between a change amount of the transmission requirement such as a throughput of the first data transmission and a change amount of the corresponding transmission requirement of the second data transmission. For example, for the complementary change association, the change coefficient in the complementary change association parameter may be, for example, a properly set negative change coefficient (such as −0.5, −1.0, −2.0, and so on), indicating that an amount by which the transmission throughput of the second data transmission is required to be changed (increased/decreased) is a product of multiplying the change amount of the transmission throughput of the first data transmission by the negative coefficient, so as to achieve the opposite change. For similar change association, the change coefficient in the similar change association parameter may be, for example, a properly set positive change coefficient (such as 0.5, 1.0, 2.0, and so on), indicating that an amount by which the transmission throughput of the second data transmission is required to be changed (increased/decreased) is a product of multiplying the change amount of the transmission throughput of the first data transmission by the positive coefficient, so as to achieve a similar change.

Furthermore, optionally, the complementary change association parameter may further include an overall requirement parameter, which is used to indicate an overall requirement of the transmission requirement in which the first data transmission and the second data transmission have complementary change trends (for example, an overall requirement of the QoS parameter of the transmission requirement with complementary change trends), for example but not limited to an overall delay requirement and an overall transmission throughput of the first data transmission and the second data transmission. For example, if the delay requirements of the first data transmission and the second data transmission have complementary change trends, the complementary change association parameter may include an overall requirement parameter indicating the overall delay requirement of the first data transmission and the second data transmission, which may be for example Xms (milliseconds).

Corresponding to the above-described first complementary/similar association information, the electronic device 200 may also receive association information for the second data transmission (second complementary/similar association information) that is, for example, included in the QoS profile of the QoS flow carrying the second data transmission (i.e., an association object indicated in the first complementary/similar association information).

For example, after receiving the first complementary/similar association information in the QoS profile of the QoS flow of the first data transmission, the allocation unit 220 of the electronic device 200 may allocate, based on the change trend of the transmission requirement indicated by the complementary/similar change association parameter of the first data transmission, transmission resources with a complementary/similar change trend in terms of that transmission requirement for the second data transmission. The allocated transmission resources preferably also meet the requirements of existing QoS parameters in the QoS profile of the QoS flow carrying the second data transmission.

Alternatively, after receiving the first complementary/similar association information of the first data transmission, the allocation unit 220 may first allocate initial transmission resources for the second data transmission regardless of the association information, and then allocate, when subsequently knowing the change trend of the transmission requirement indicated by the complementary/similar change association parameters of the first data transmission, transmission resources with a complementary/similar change trend in terms of that transmission requirement for the second data transmission. The allocated transmission resources preferably also meet the requirements of existing QoS parameters in the QoS profile of the QoS flow carrying the second data transmission.

Here, the electronic device 200 may, for example, monitor the change amount of the transmission throughput of the related data transmission by itself. Alternatively, the change amount of the transmission throughput related to data transmission may be monitored by the core network device, and the electronic device 200 may obtain information related to the change amount of the transmission throughput from the core network device through communication with the core network device, and perform subsequent processing accordingly, which is not described here.

For example, taking as an instance, a case where the transmission requirement whose complementary/similar change trend is indicated by the first complementary/similar association information is a transmission throughput, and the complementary/similar change association parameters include a complementary/similar change coefficient. In this instance, for example, after receiving the first complementary/similar association information in the QoS profile of the QoS flow of the first data transmission, the allocation unit 220 of the electronic device 200 may allocate, based on the change trend of the transmission throughput of the first data transmission, a transmission throughput with a (complementary/similar) change amount for the second data transmission, the (complementary/similar) change amount being the change amount of the transmission throughput of the first data transmission multiplied by this change coefficient. As an example, when monitoring by itself or knowing by other means (for example, knowing from the core network device) that the change amount of the transmission throughput of the first data transmission exceeds a predetermined threshold (or that the transmission throughput does not change within a certain time after monitoring or knowing by other means that the change amount of the transmission throughput of the first data transmission exceeds the predetermined threshold) for example, the electronic device 200 may allocate, based on monitored or known change trend (increasing/decreasing) of the transmission throughput of the first data transmission, transmission resources with a opposite/similar change trend (decreasing/increasing) in the transmission throughput for the second data transmission.

Figure 6:
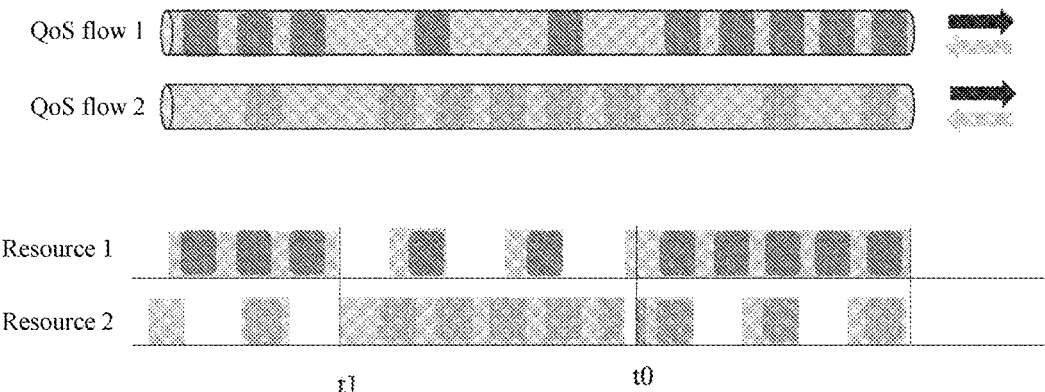
FIG. 6 is an explanatory diagram for explaining an example of allocating transmission resources for data transmissions with complementary change association.
Figure 7:
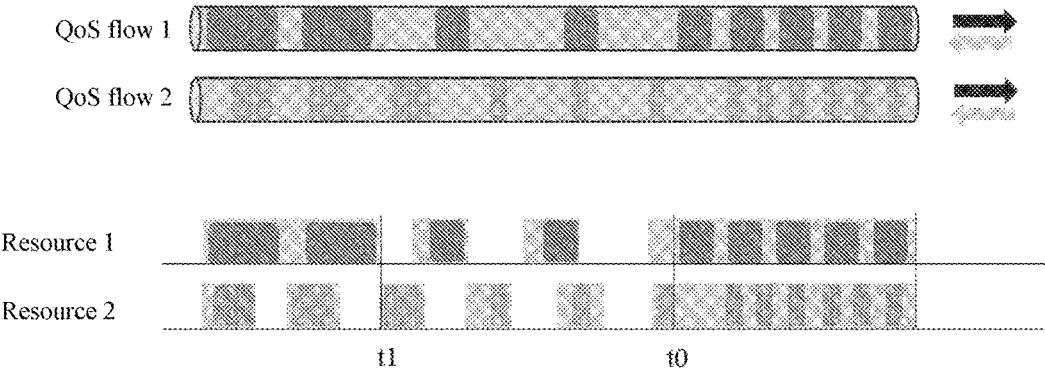
FIG. 7 is an explanatory diagram for explaining an example of allocating transmission resources for data transmissions with similar change association.

FIG. 6 and FIG. 7 are explanatory diagrams for explaining an example of allocating transmission resources for data transmissions with complementary change association and similar change association, respectively.

First, referring to FIG. 6, the upper side of FIG. 6 schematically shows a QoS flow 1 and a QoS flow 2 carrying a first data transmission and a second data transmission (each involving multiple data packets) that have complementary changes in the transmission throughput, where the right arrow and the left arrow indicate transmission directions (sending and reception).

The lower side of FIG. 6 schematically shows Resource 1 and Resource 2 allocated by the electronic device 200 for the first data transmission and the second data transmission. As shown in the Figure, for example, at time instants t0 and t1 when it is monitored that the change of the transmission throughput of the first data transmission exceeds a predetermined threshold, the electronic device 200 allocates, based on the monitored change trend (increasing/decreasing) in the transmission throughput of the first data transmission, transmission resources that have an opposite change trend (decreasing/increasing) in the transmission throughput for the second data transmission.

FIG. 7 shows, in a similar way to FIG. 6, a first data transmission and a second data transmission that have similar changes in the transmission throughput and that are carried by the QoS flow 1 and QoS flow 2. For example, at time instants t0 and t11 when the change in transmission throughput of the first data transmission is monitored to exceed a predetermined threshold, the electronic device 200 allocates, based on the monitored change trend (increasing/decreasing) in the transmission throughput of the first data transmission, transmission resources that have a similar change trend in transmission throughput for the second data transmission.

Next, as an alternative example, a scenario is considered in which the association information of the first data transmission indicates two types of association relationships, i.e. trigger association and complementary change association. In this scenario, the first data transmission triggers the second data transmission, and the first data transmission and the second data transmission have a certain overall delay requirement. In this example, the association information may indicate the first data transmission as a trigger through the included trigger association parameter and indicate the trigger delay Δt (ms) through the included trigger association parameter, and may indicate that the delay requirement is the transmission requirement with a complementary change trend through the included complementary change association parameter, and the complementary change association parameter may include an overall requirement parameter Xms for indicating the overall delay requirement.

For example, after receiving the above-described association information in the QoS profile of the QoS flow of the first data transmission, the allocation unit 220 of the electronic device 200 may allocate preferentially, based on the trigger delay Δt and the overall requirement parameter Xms in the association information as well as the calculated, measured or otherwise known (for example, from the core network device) delay xms of the first data transmission, transmission resources that can meet the determined delay requirement (X−x−Δt) in the time domain for the second data transmission. In this way, the overall delay from the start of data packet transmission of the first data transmission to the end of data packet transmission of the second data transmission is Xms. Here, for a special case that the trigger delay Δt=0 (that is, a case that the second data transmission is performed immediately after the first data transmission), the electronic device 200 may preferentially allocate transmission resources that can meet the delay requirement (X-x) ms in the time domain for the second data transmission.

Fifth Example of Allocating Transmission Resources

The association information received by the electronic device 200 which is, for example, included in the QoS profile of the QoS flow carrying the first data transmission, may be an association relationship indicating coexistence association (first coexistence association information). Corresponding to the first coexistence association information, the electronic device 200 may also receive association information (second coexistence association information) for the second data transmission (i.e., an association object indicated in the first coexistence association information) which is, for example, included in the QoS profile of the QoS flow carrying the second data transmission.

As an example, for example, after receiving the first coexistence association information in a QoS profile of a QoS flow carrying a first data transmission, the allocation unit 220 of the electronic device 200 may allocate an initial transmission resource for a second data transmission regardless of the first coexistence association information. The allocated transmission resources preferably meet the requirements of the existing QoS parameters in the QoS profile of the QoS flow carrying the second data transmission.

Thereafter, the allocation unit 220 may determine whether to continue to allocate transmission resources for the second data transmission based on whether the first data transmission is in progress. For example, the allocation unit 220 may determine to stop allocating transmission resources for the second data transmission in a case that the first data transmission (or a data service to which the first data transmission belongs) is suspended/interrupted/stopped due to congestion/unavailability of communication resources/no service/link disconnection. In this case, the second data transmission may be suspended/interrupted/stopped, such that air interface resources are relatively saved, thereby improving the effective utilization rate of air interface resources.

Here, the electronic device 200 may, for example, detect whether the first data transmission is in progress by itself via the allocation unit 220, and accordingly determine whether to continue to allocate transmission resources for the second data transmission. Alternatively, whether the first data transmission is in progress may be monitored by a core network device, and the electronic device 200 may obtain information related to whether the first data transmission is in progress (such as notification information) from the core network device through communication with the core network device, and perform subsequent processing accordingly. In any of above cases, it is preferable that the allocated transmission resources also meet the requirements of the existing QoS parameters in the QoS profile of the QoS flow carrying the second data transmission. Furthermore, optionally, when the allocation unit 220 determines to stop or suspend the allocation of transmission resources for the second data transmission based on the fact that the first data transmission is not in progress, the electronic device 200 may also send notification information to a user equipment to which the second data transmission belongs, to indicate that the reason why the second data transmission is stopped or suspended is coexistence association (that is, the first data transmission that has a coexistence association with the second data transmission is not in progress).

Further details of the process of allocating transmission resources by the electronic device 200 based on the association type and optional association parameters included in the association information are described above by means of the first example to fifth example. On a basis of the above examples in which the first data transmission and the second data transmission are carried on different QoS flows, those skilled in the art can similarly apply the embodiments to a case in which data transmission are carried on the same QoS flow, which is not further described here.

Alternatively, the electronic device 200 may, for example, generate resource information indicating transmission resources allocated for the first data transmission or the second data transmission via the allocation unit 220, and send the resource information to a user equipment to which the first data transmission or the second data transmission belongs, such that the user equipment may perform corresponding data transmission by using the indicated transmission resources.

In the above example, the electronic device 200 may directly allocate transmission resources for the first data transmission and the second data transmission. That is, it is preferable that the user equipment that performs the first data transmission and the second data transmission is within the coverage range of the electronic device 200 as the base station device. For example, in a case that the second user equipment that performs the second data transmission is not within the coverage range of the electronic device 200 (for example, it is determined by the UE ID field in the association object ID in the association information for the first data transmission), the electronic device 200 may perform signaling interaction with a base station that provides services for the second user equipment (that has functions similar to those of the electronic device 200) via the core network device, and perform resource allocation for the first data transmission and the second data transmission by collaborating with each other (two serving base stations use a manner similar to one serving base station, i.e., one electronic device 200).

With the electronic device according to this embodiment, transmission resources that meet the association relationship may be allocated to different data transmissions based on the association relationship between the different data transmissions.

[3.3 Example of Signaling Interaction]

On a basis of having described the example configuration and example processing of the electronic device according to the first embodiment and the electronic device according to the second embodiment respectively, next, an example signaling interaction flow between the electronic device according to the first embodiment and the electronic device according to the second embodiment will be briefly described with reference to FIG. 8 and FIG. 9A to FIG. 9B.

Figure 8:
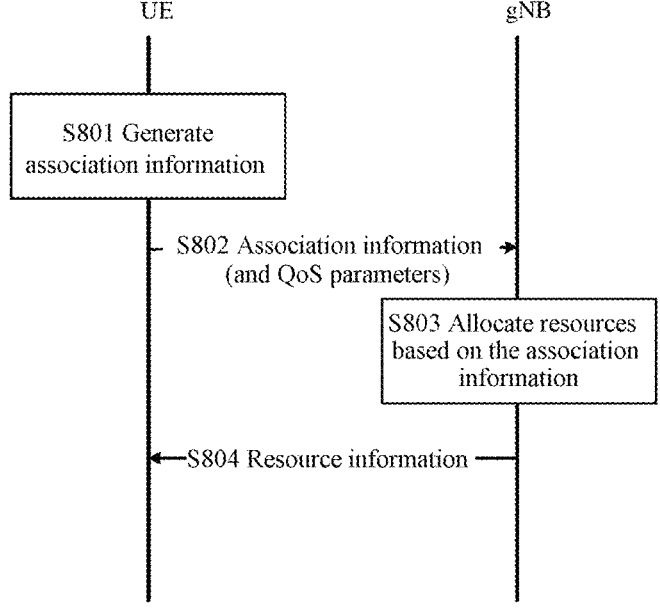
FIG. 8 is a flowchart showing one example of an information interaction process according to an embodiment of the present disclosure.

First, reference is made to FIG. 8. FIG. 8 is a flowchart showing one example of an information interaction process according to an embodiment of the present disclosure, which shows an example interaction process in a case that association information is provided by a user equipment. In the example in FIG. 8, the UE may be implemented by the electronic device 100, the gNB may be implemented by the electronic device 200, and the first data transmission by the UE is performed via a D2D communication with another user equipment.

As shown in FIG. 8, in step S801, the UE generates association information for a first data transmission. In step S802, the UE sends the association information together with QoS parameters of a QoS flow carrying the first data transmission to gNB. Here, for example, the above-described associated information may be carried by the UESidelinkinformationNR signaling belonging to RRC signaling. In step S803, gNB allocates resources for the UE based on the association information. In optional step S804, gNB may send resource information indicating the allocated transmission resources to the UE.

Furthermore, although not shown in FIG. 8, in some cases, this example signaling interaction flow may include one or more other optional steps. For example, in a case that the association information indicates an association relationship such as switchable association, complementary/similar change association or coexistence association, after step S804, gNB may monitor the first data transmission and/or the second data transmission (the second data transmission is an association object indicated by the association information) based on the association relationship indicated by the association information or know, for example from the core network device, a result of monitoring the first data transmission and/or the second data transmission based on the association relationship indicated by the association information. gNB may perform subsequent resource allocation based on the monitored data transmission or the known data transmission result, and then optionally send resource information indicating the allocated transmission resources to the UE. Optionally, when necessary (for example, in a case that the first data transmission and/or the second data transmission meets a condition or relationship corresponding to an association type or association parameter indicated by the association information), gNB may also send association relationship notification information to the UE, where the association relationship notification information is used to notify a result of monitoring the first data transmission and/or the second data transmission based on the association relationship indicated by the association information or information related to the result.

For example, in a case that the association information indicates the switchable association, gNB may monitor by itself or know from the core network device the transmission quality/transmission condition/data level of the first data transmission and the second data transmissions, and may allocate, in a case that the data level corresponds to a data level indicated by the switching association parameter included in the first switching association information, transmission resources of the indicated data level for the first data transmission of the UE. For another example, in a case that the association information indicates complementary/similar association, gNB may monitor by itself or know from the core network device a change trend of the transmission requirement indicated by the complementary/similar change association parameters of the second data transmission, and allocate transmission resources with the complementary/similar change trend in terms of the transmission requirement for the first data transmission of the UE based on the change trend. For another example, in a case that the association information indicates coexistence association, gNB may monitor by itself or know from the core network device whether the second data transmission is in progress, and accordingly continue or stop allocating transmission resources for the first data transmission of UE.

Figure 9A:
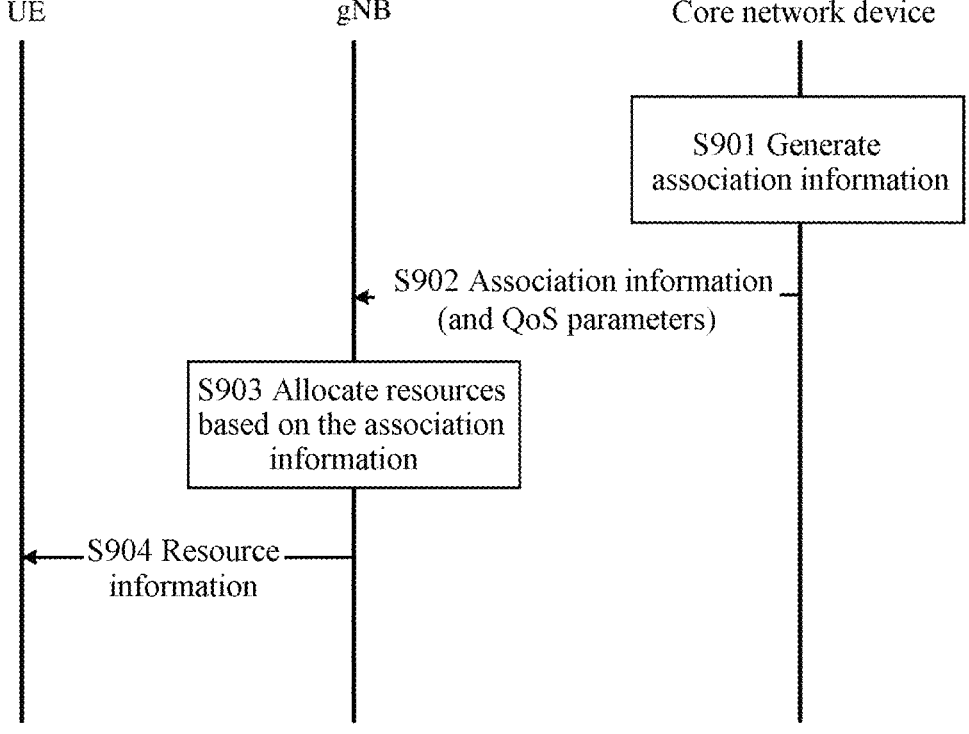
FIG. 9A and FIG. 9B are flowcharts showing another examples of an information interaction process according to an embodiment of the present disclosure.
Figure 9B:
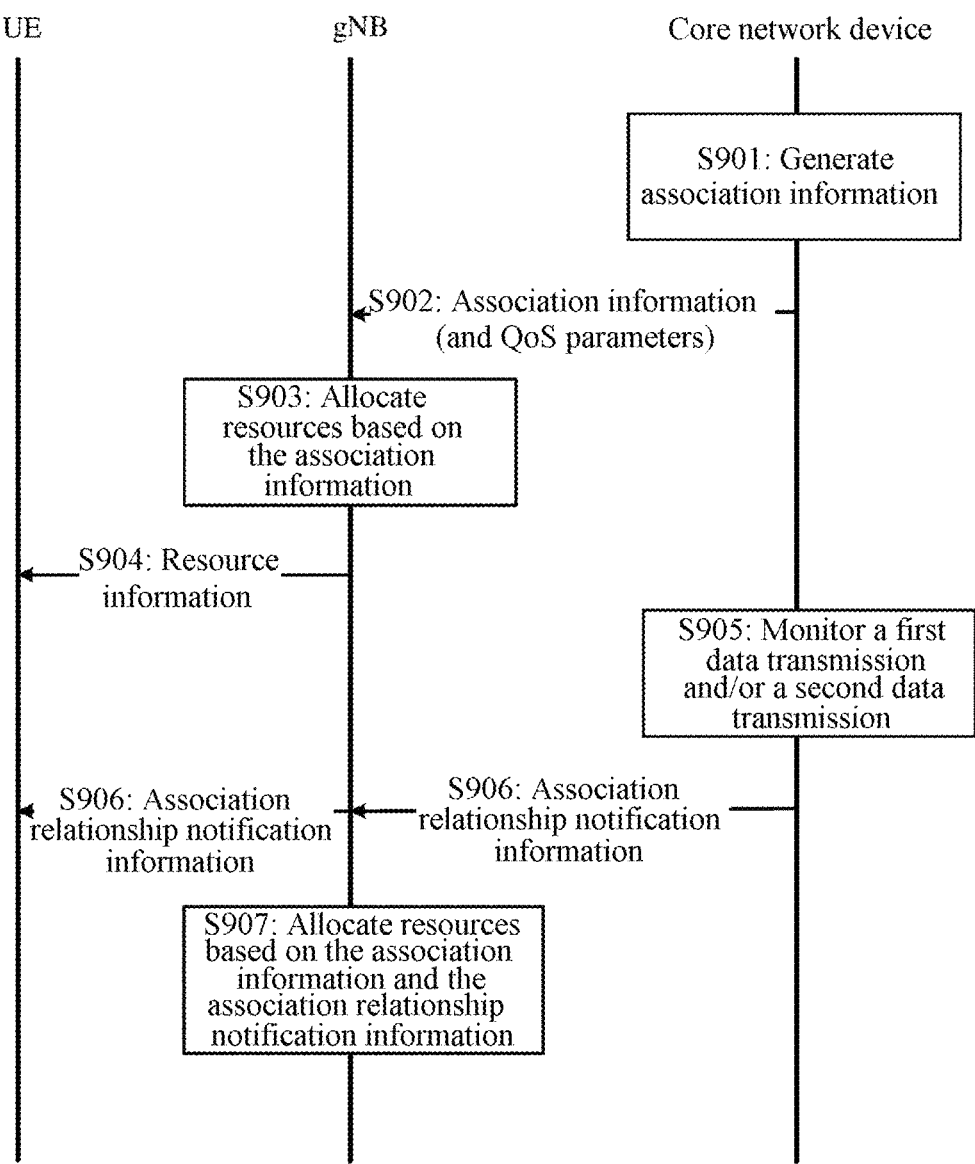

Reference is now made to FIG. 9A and FIG. 9B. FIG. 9A and FIG. 9B are flowcharts showing other examples of an information interaction process according to an embodiment of the present disclosure, which show an example interaction process in a case that association information is provided by a core network device. In the examples of FIG. 9A and FIG. 9B, the core network device may be implemented by the electronic device 100, the gNB may be implemented by the electronic device 200, and the UE is a first user equipment that performs a first data transmission (which is for example, but not limited to implemented by the electronic device 100), and the first data transmission is performed, for example, via communication between the UE and other devices.

Reference is first made to FIG. 9A. As shown in FIG. 9A, in step S901, the core network device generates association information for the first data transmission of the UE. In step S902, the core network device sends the association information together with the QoS parameters of a QoS flow carrying the first data transmission to gNB. Here, for example, the above-described association information may be carried in N2 SM information IE (N2 Session Management Information Unit) carried in N2 PDU Session Request signaling between AMF (Access and Mobility Management Function) and RAN (Radio Access Network). In step S903, gNB allocates resources for the UE based on the association information. In optional step S904, gNB may send resource information indicating the allocated transmission resources to the UE.

It is to be noted that although not shown in FIG. 9A, this example signaling interaction flow may include one or more other optional steps. For example, before step S901, association information (for example but not limited to associa- tion parameters in the association information) for the first data transmission of the UE may be generated by the UE (for example, during D2D communication), and may be indi- cated to the core network device by appropriate signaling (such as a PDU session establishment request or a PDU session modification request in NAS signaling). In this case, in step S901, the core network device may determine association information that is finally used for the first data transmission of the UE based on the association information generated by itself (for example but not limited to the association parameters in the association information, such as those from the application function AF of the core network) and the association information indicated by the UE.

Reference is next made to FIG. 9B. The example signal- ing interaction flow shown in FIG. 9B includes additional steps S905 to S907 in addition to steps S901 to S904 shown in FIG. 9A.

For example, in a case that the association information generated in step S901 indicates an association relationship such as switchable association, complementary/similar change association or coexistence association, in step S905, the core network device may, based on the association relationship indicated by the association information, moni- tor a first data transmission and/or a second data transmis- sion of a related gateway (the second data transmission is an association object indicated by the association information), for example, via a Session Management Function (SMF) or a User Plane Function (UPF). For example, in a case that the association information indicates switchable association, the core network device may monitor the transmission quality/ transmission condition/data level of the first data transmission and the second data transmission; in a case that the association information indicates complementary/similar association, the core network device may monitor the change trend of a transmission requirement indicated by the complementary/similar change association parameters of the second data transmission; in a case that the association information indicates coexistence association, the core net- work device may monitor whether the second data trans- mission is in progress.

Next, in step S906, the core network device may also send, based on the association relationship indicated by the association information, association relationship notification information to gNB and UE when necessary (for example, when the first data transmission and/or the second data transmission meets a condition or relationship correspond- ing to an association type or association parameters indi- cated by the association information), where the association relationship notification information is used to notify a result of monitoring the first data transmission and/or the second data transmission based on the association relationship indi- cated by the association information or information related to the result.

For example, in a case that the association information indicates switchable association, the association relationship notification information may indicate that the transmission quality of the first data transmission and the second data transmissions has changed, and so on; in a case that the association information indicates complementary/similar association, the association relationship notification infor- mation may indicate that the related transmission require- ment (e.g., QoS parameters, such as traffic) of the second data transmission has a trend complementary/similar to that of the first data transmission; in a case that the association information indicates coexistence association, the associa- tion relationship notification information may indicate whether the second data transmission is in progress. Taking a case in which the association information indicates coex- istence association and the second data transmission is downlink data transmission as an example, the core network device (such as UPF) may monitor the data transmission of the relevant gateway, and generate association relationship notification information when there is no downlink data at the gateway for a long time to indicate that the second data transmission is not in progress.

The above-described association relationship notification information may be notified to the UE and the base station respectively by NAS/RRC signaling and corresponding RRC signaling, where the NAS signaling is piggybacked on the RRC signaling to be sent to the base station and further sent to the UE.

Next, in step S907, gNB may allocate resources for the UE based on the association information received earlier and the association relationship notification information received in step S906. For example, in a case of comple- mentary/similar association, gNB may allocate, based on the change trend of the related transmission requirement for the second data transmission indicated by the association rela- tionship notification information, transmission resources that have a complementary/similar change trend in terms of the transmission requirement for the first data transmission of UE. For another example, in a case that the association information indicates coexistence association, gNB may stop allocating transmission resources for the first data transmission of UE based on the fact that the second data transmission is not in progress as indicated by the associa- tion relationship notification information.

Furthermore, although not shown in FIG. 9B, optionally, the UE may make necessary adjustments to data service and/or upper application service to which the first data transmission belongs based on the association relationship notification information received in step S906. For example, in a case of complementary/similar association, the UE may increase/decrease the traffic for the related data service based on the association relationship notification information, and may adjust the upper application service (for example, when the first data transmission involves video transmission, the adjustment of the upper application service may include the adjustment of video resolution, and so on). For another example, in a case of coexistence association, the UE may stop the data service to which the first data transmission belongs and may stop the corresponding upper layer application based on the association relationship notification information.

It is to be noted that in FIG. 9B, the processing of monitoring the first data transmission and/or the second data transmission in step S905 and the processing of sending the association relationship notification information in step S906 are shown as being performed by the core network device. Alternatively, all the above-described processes may be performed by gNB, that is, an executive body of step S905 may be modified to gNB, and step S906 may be modified to send association relationship notification information to UE and core network device respectively by gNB to indicate that the data service to which the first data transmission belongs is required to be adjusted (for example, to indicate that the UE is required to adjust the related data service and the upper application content, and the core network device stops the related session accordingly).

Method Embodiment

Corresponding to the above-described apparatus embodiments, the following method embodiments are provided according to the present disclosure.

A communication method according to a first embodiment of the present disclosure is first described, which is for example performed by the electronic device 100.

Figure 10:
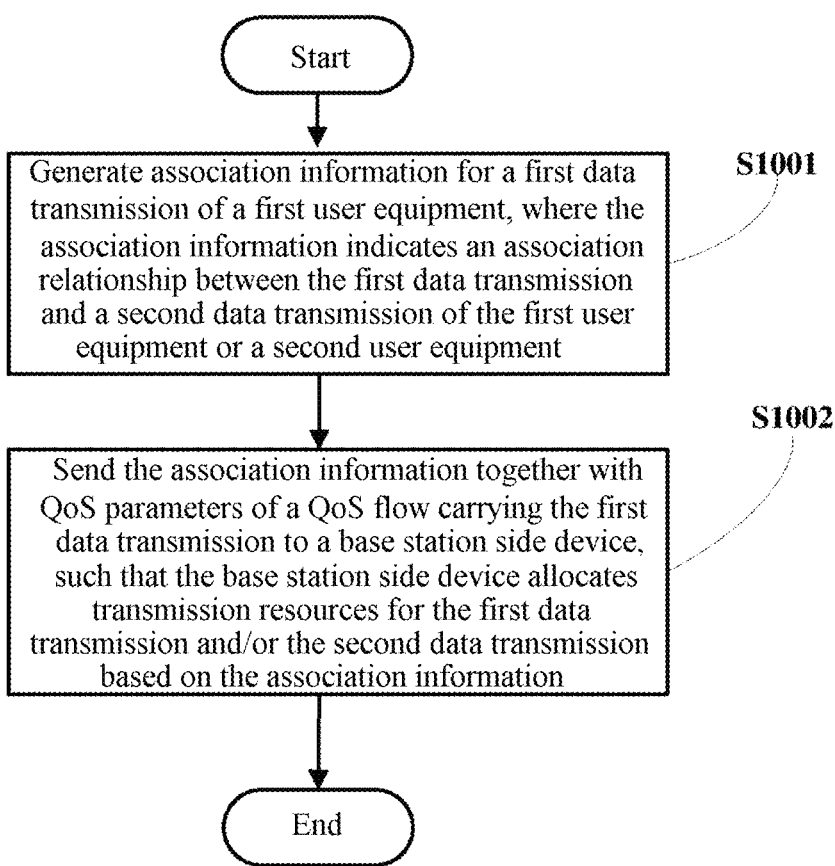
FIG. 10 is a flowchart showing a procedure example of a communication method according to a first embodiment of the present disclosure.

FIG. 10 is a flowchart showing a procedure example of a communication method according to a first embodiment of the present disclosure.

As shown in FIG. 10, in step S1001, association information for a first data transmission of a first user equipment is generated, where the association information indicates an association relationship between the first data transmission and a second data transmission of the first user equipment or a second user equipment.

Thereafter, in step S1002, the association information is sent together with QoS parameters of a QoS flow carrying the first data transmission to a base station side device, such that the base station side device allocates transmission resources for the first data transmission and/or the second data transmission based on the association information.

In an embodiment, the association information includes association type information indicating an association type to which the association relationship belongs.

As an example, the association type may include one or more of synchronization association, switchable association, trigger association, complementary change association, similar change association and coexistence association.

Preferably, the association information may further include association parameters related to the association type.

For example, the association parameters may include a synchronization association parameter, which indicates a time range and granularity of synchronous transmission between the first data transmission and the second data transmission.

For example, the association parameters may include a switching association parameter, which indicates a data level corresponding to the first data transmission.

For example, the association parameters may include a trigger association parameter, which indicates a trigger delay between the first data transmission and the second data transmission.

For example, the association parameters may include a complementary change association parameter, which indicates a transmission requirement of the first data transmission that has a complementary change trend to the transmission requirement of the second data transmission.

For example, the association parameters may include a similar change association parameter, which indicates a transmission requirement of the first data transmission that has a similar change trend to the transmission requirement of the second data transmission.

According to embodiment of the present disclosure, the subject performing the above method may the electronic device 100 according to embodiment of the present disclosure. Therefore, various aspects of the foregoing embodiments about the electronic device 100 are applicable to the method.

Figure 11:
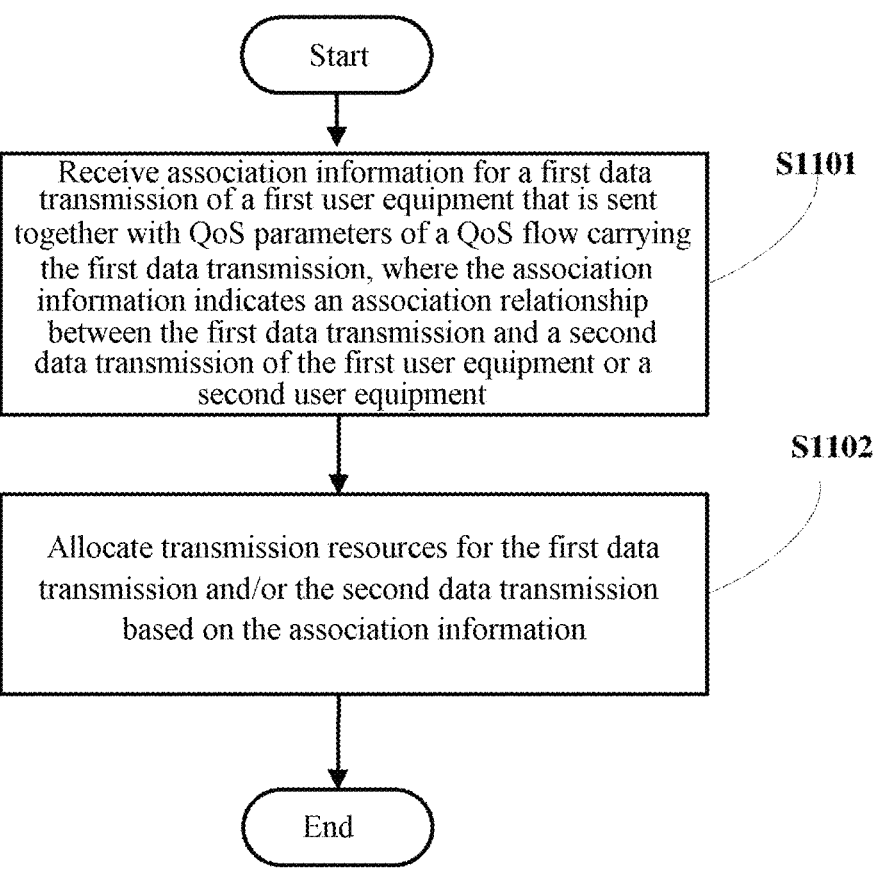
FIG. 11 is a flowchart showing a procedure example of a communication method according to a second embodiment of the present disclosure.

FIG. 11 is a flowchart showing a procedure example of a communication method according to a second embodiment of the present disclosure.

As shown in FIG. 11, in step S1101, association information for a first data transmission of a first user equipment that is sent together with QoS parameters of a QoS flow carrying the first data transmission is received, where the association information indicates an association relationship between the first data transmission and a second data transmission of the first user equipment or a second user equipment Thereafter, in step S1202, transmission resources is allocated for the first data transmission and/or the second data transmission based on the association information. In an embodiment, the association information includes association type information indicating an association type to which the association relationship belongs. In this case, in step S1002, the allocation of transmission resources may be, for example, performed based on the association type.

As an example, the association type may include one or more of synchronization association, switchable association, trigger association, complementary change association, similar change association and coexistence association.

Preferably, the association information may further include association parameters related to the association type.

For example, the association parameters may include a synchronization association parameter, which indicates a time range and granularity of synchronous transmission between the first data transmission and the second data transmission. In this case, in step S1002, for example, transmission resources that meet requirements of the time range and the granularity of the synchronous transmission indicated by the synchronization association parameter may be allocated for the first data transmission and the second data transmission.

For example, the association parameters may include a switching association parameter, which indicates a data level corresponding to the first data transmission. In this case, in step S1002, for example, in a case that a data level determined based on a transmission quality of and/or available transmission resources for the first data transmission or the second data transmission corresponds to a data level indicated by the switching association parameter, transmission resources of the indicated data level may be allocated for the first data transmission.

For example, the association parameters may include a trigger association parameter, which indicates a trigger delay between the first data transmission and the second data transmission. In this case, in step S1002, for example, transmission resources involving the trigger delay indicated by the trigger association parameter with respect to transmission time of a trigger party may be allocated for a triggered party in the first data transmission and the second data transmission.

For example, the association parameters may include a complementary change association parameter, which indicates a transmission requirement of the first data transmission that has a complementary change trend to the transmission requirement of the second data transmission. In this case, in step S1002, for example, based on the change trend of the transmission requirement indicated by the complementary change association parameter of the first data transmission, transmission resources with an opposite change trend in terms of the transmission requirement for the second data transmission may be allocated.

For example, the association parameters may include a similar change association parameter, which indicates a transmission requirement of the first data transmission that has a similar change trend to the transmission requirement of the second data transmission. In this case, in step S1002, for example, based on the change trend of the transmission requirement indicated by the similar change parameter of the first data transmission, transmission resources with a similar change trend in terms of the transmission requirement for the second data transmission may be allocated.

According to embodiments of the present disclosure, the execution subject performing the method may be the electronic device 200 according to the embodiment of the present disclosure. Therefore, various aspects of the foregoing embodiments about the electronic device 200 are applicable to the method.

5. Application Example

The technology of the present disclosure may be applied to various products.

For example, the electronic device 200 on the base station side may be implemented as any type of base station device, such as a macro eNB and a small eNB, or may be implemented as any type of gNB (a 5G base station). The small eNB may be an eNB covering a cell smaller than a macro cell, such as a pico eNB, a micro eNB, or a home (femto) eNB. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body.

In addition, the electronic device 200 on the base station side may also be implemented as any type of TRP. The TRP may have transmitting and receiving functions. For example, the TRP may receive information from a user equipment and a base station device, and may send information to the user equipment and the base station device. In a typical example, the TRP may provide services for the user equipment and is controlled by the base station device. Further, the TRP may have a structure similar to that of the base station device, or may only have a structure related to transmitting and receiving information in the base station device.

The electronic device 100 may be implemented as various types of user equipment or core network device. The electronic device 100 may be implemented as a mobile terminal (such as a smart phone, a tablet personal computer (PC), a notebook PC, a portable game terminal, a portable/dongle type mobile router, and a digital camera) or an in-vehicle terminal (such as an vehicle navigation device) in a case that the electronic device 100 is implemented as a user equipment. The user equipment may also be implemented as a terminal performing machine to machine (M2M) communication (also referred to as a machine-type communication (MTC) terminal). In addition, the user equipment may further be a wireless communication module (such as an integrated circuitry module including one wafer) mounted on each of the above user equipment.

Application Example Regarding Base Station

First Application Example

Figure 12:
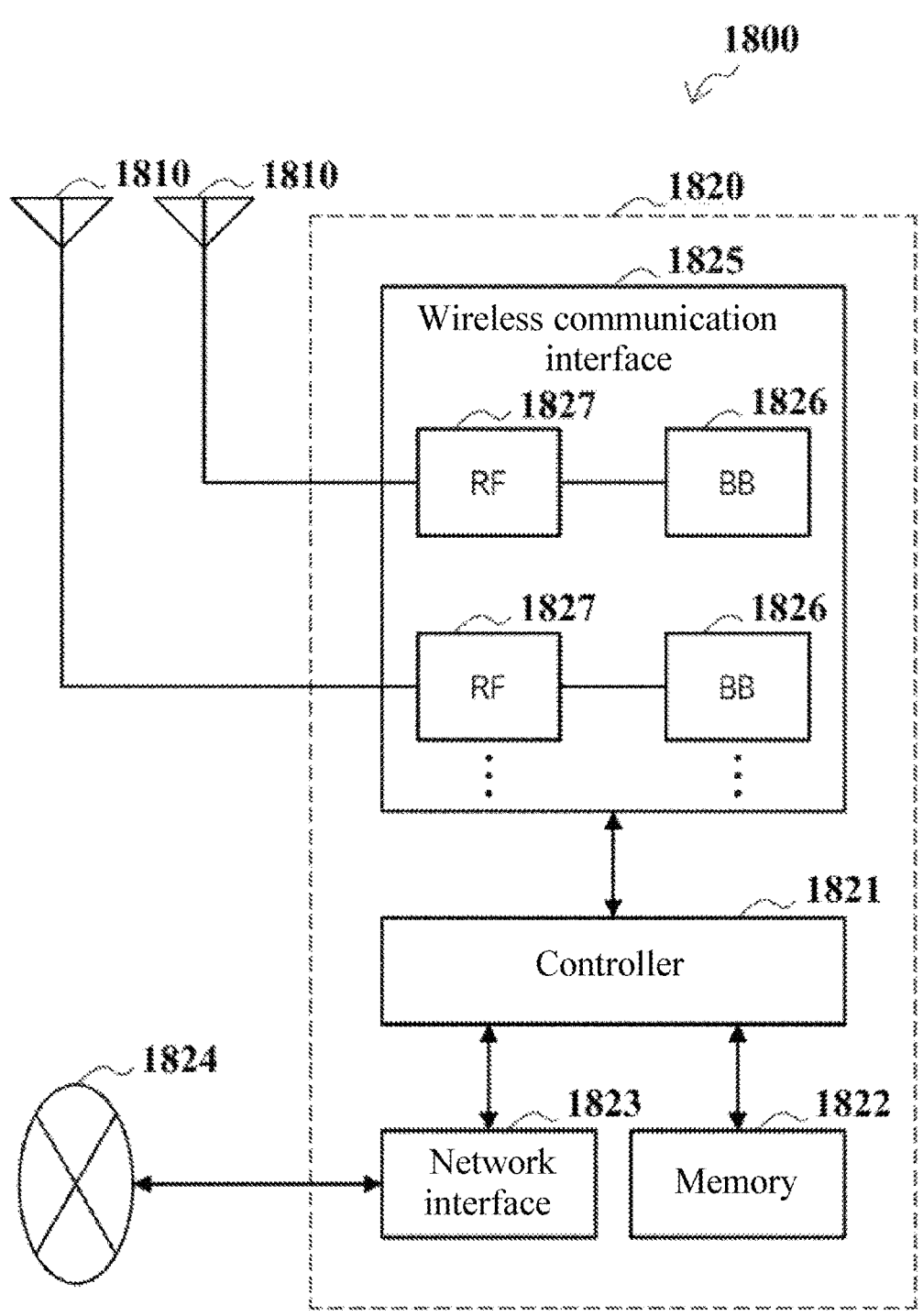
FIG. 12 is a block diagram showing a first example of a schematic configuration of an eNB to which the technology of the present disclosure may be applied.

FIG. 12 is a block diagram showing a first example of a schematic configuration of an eNB to which the technology of the present disclosure may be applied. The eNB 1800 includes one or more antennas 1810 and a base station device 1820. The base station device 1820 and each antenna 1810 may be connected with each other via RF cable.

Each of the antennas 1810 includes single antenna element or multiple antenna elements (such as multiple antenna elements included in a multiple-input multiple-output (MIMO) antenna), and are used for transmitting and receiving a wireless signal by the base station device 1820. The eNB 1800 may include the multiple antennas 1810, as shown in FIG. 12. For example, the multiple antennas 1810 may be compatible with multiple frequency bands used by the eNB 1800. Although FIG. 12 shows an example in which the eNB 1800 includes multiple antennas 1810, the eNB 1800 may also include a single antenna 1810.

The base station device 1820 includes a controller 1821, a memory 1822, a network interface 1823, and a wireless communication interface 1825.

The controller 1821 may be, for example, a CPU or a DSP, and operates various functions of a higher layer of the base station device 1820. For example, the controller 1821 generates a data packet based on data in a signal processed by the wireless communication interface 1825, and transfers the generated packet via a network interface 1823. The controller 1821 may bundle data from multiple baseband processors to generate bundled packet, and transfer the generated bundled packet. The controller 1821 may have logic functions for performing the following control: wireless resource control, wireless carrying control, mobility management, admission control and schedule. The control may be performed in corporation with a nearby eNB or core network node. The memory 1822 includes an RAM and an ROM, and stores a program executed by the controller 1821 and various types of control data (such as a terminal list, transmission power data and scheduling data).

The network interface 1823 is a communication interface for connecting the base station device 1820 to a core network 1824. The controller 1821 may communication with the core network node or another eNB via the network interface 1823. In this case, the eNB 1800 and the core network node or another eNB may be connected to each other via a logic interface (such as an Si interface and an X2 interface). The network interface 1823 may be a wired communication interface or a wireless communication interface for a wireless backhaul line. If the network interface 1823 is a wireless communication interface, the network interface 1823 may use a higher frequency band for wireless communication as compared with the frequency band used by the wireless communication interface 1825.

The wireless communication interface 1825 supports any cellular communication scheme (such as Long Term Evolution (LTE) and LTE-Advanced), and provides wireless connection to a terminal located in a cell of the eNB 1800 via the antenna 1810. The radio communication interface 1825 may generally include for example a BB processor 1826 and an RF circuit 1827. The BB processor 1826 may perform, for example, encoding/decoding, modulating/demodulating, and multiplexing/de-multiplexing, and perform various types of signal processing of layers (such as L1, medium access control (MAC), radio link control (RLC), and packet data convergence protocol (PDCP)). Instead of the controller 1821, the BB processor 1826 may have a part or all of the above-described logic functions. The BB processor 1826 may be a memory storing communication control programs, or a module including a processor which is configured to execute the programs and a related circuit. Update of the programs may change the function of the BB processor 1826. The module may be a card or a blade inserted into a slot of the base station device 1820. Alternatively, the module may be a chip installed on the card or the blade. In addition, the RF circuit 1827 may include for example a frequency mixer, a filter or an amplifier, and transmits and receives a radio signal via the antenna 1810.

The wireless communication interface 1825 may include multiple BB processors 1826, as shown in FIG. 12. For example, the multiple BB processors 1826 may be compatible with multiple frequency bands used by the eNB 1800. The wireless communication interface 1825 may include the multiple RF circuits 1827, as shown in FIG. 12. For example, the multiple RF circuits 1827 may be compatible with the multiple antenna elements. Although FIG. 12 shows an example in which the wireless communication interface 1825 includes the multiple BB processors 1826 and the multiple RF circuits 1827, the wireless communication interface 1825 may also include a single BB processor 1826 and a single RF circuit 1827.

In the eNB 1800 shown in FIG. 12, part or all of the functions of the allocation unit 220 in the electronic device 200 described with reference to FIG. 2 may be implemented by the controller 1821, for example, by executing instructions stored in the memory 1822.

Second Application Example

Figure 13:
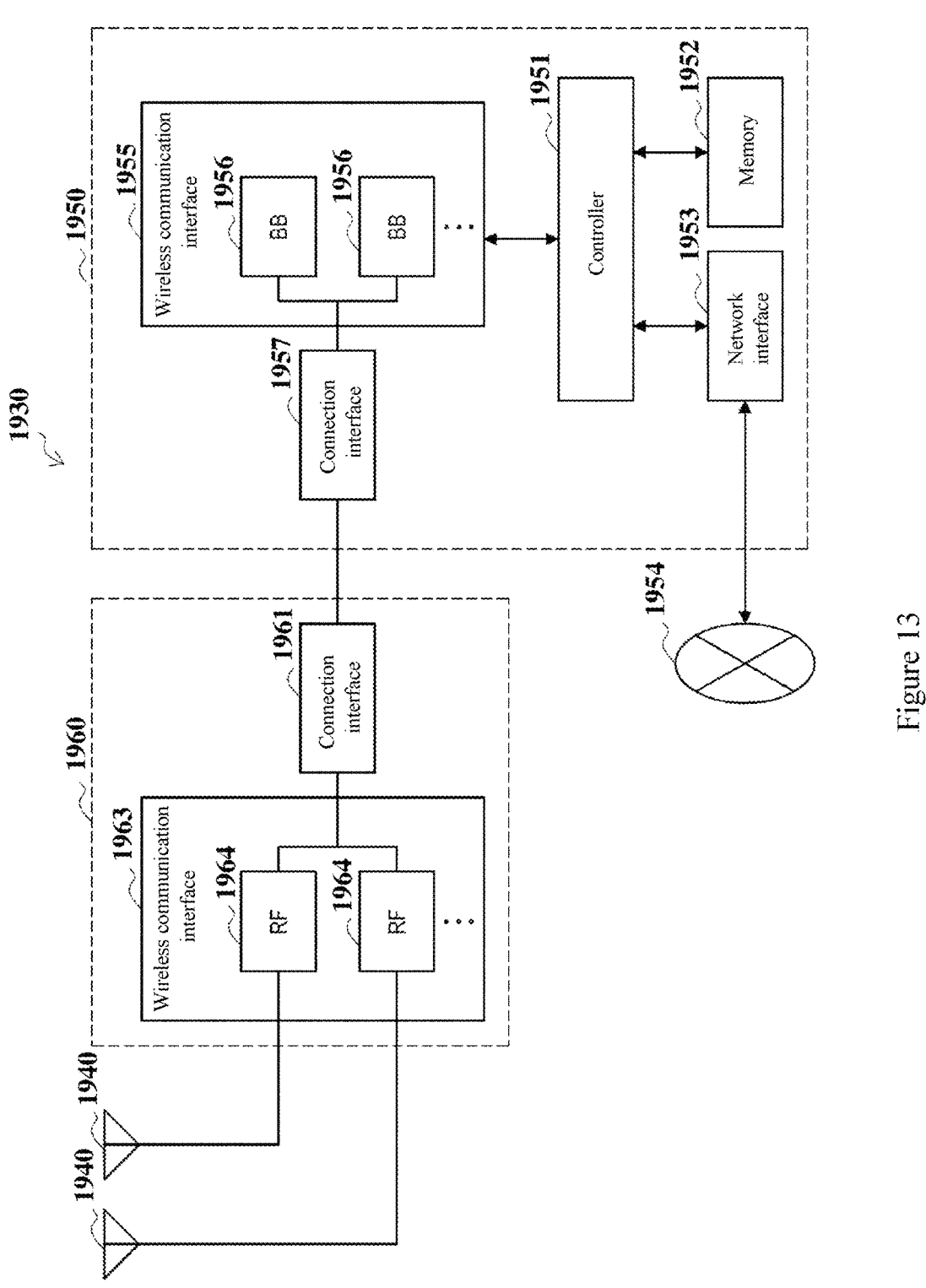
FIG. 13 is a block diagram showing a second example of a schematic configuration of an eNB to which the technology of the present disclosure may be applied.

FIG. 13 is a block diagram showing a second example of a schematic configuration of an eNB to which the technology of the present disclosure may be applied. An eNB 1930 includes one or more antennas 1940, a base station device 1950 and an RRH 1960. The RRH 1960 and Each antenna 1940 may be connected to each other via an RF cable. The base station device 1950 and the RRH 1960 may be connected to each other via a high-speed line such as a fiber cable.

Each of the antennas 1940 includes a single antenna element or multiple antenna elements (such as multiple antenna elements included in an MIMO antenna), and is used for transmitting and receiving a radio signal by the RRH 1960. As shown in FIG. 13, the eNB 1930 may include multiple antennas 1940. For example, the multiple antennas 1940 may be compatible with multiple frequency bands used by the eNB 1930. Although FIG. 13 shows an example in which the eNB 1930 includes multiple antennas 1940, the eNB 1930 may also include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 12, respectively.

The wireless communication interface 1955 supports any cellular communication scheme (such as LTE and LTE-advanced), and provides wireless communication to a terminal located in a sector corresponding to the RRH 1960 via the RRH 1960 and the antenna 1940. The wireless communication interface 1955 may typically include a BB processor 1956 for example. The BB processor 1956 is the same as the BB processor 1826 described with reference to FIG. 12, except that the BB processor 1956 is connected to the RF circuitry 1964 of the RRH 1960 via the connection interface 1957. As shown in FIG. 13, the wireless communication interface 1955 may include multiple BB processors 1956. For example, the multiple BB processors 1956 may be compatible with the multiple frequency bands used by the eNB 1930. Although FIG. 13 shows an example in which the wireless communication interface 1955 includes multiple BB processors 1956, the wireless communication interface 1955 may also include a single BB processor 1956.

The connection interface 1957 is an interface for connecting the base station device 1950 (wireless communication interface 1955) to the RRH 1960. The connection interface 1957 may also be a communication module for communication in the above-described high-speed line via which the base station equipment 1950 (wireless communication interface 1955) is connected to the RRH 1960.

The RRH 1960 includes a connection interface 1961 and a wireless communication interface 1963.

The connection interface 1961 is an interface for connecting the RRH 1960 (the wireless communication interface 1963) to the base station device 1950. The connection interface 1961 may also be a communication module for the communication in the above high-speed line.

The wireless communication interface 1963 transmits and receives a radio signal via the antenna 1940. The wireless communication interface 1963 may typically include, for example, the RF circuit 1964. The RF circuit 1964 may include for example a frequency mixer, a filter and an amplifier, and transmits and receives a radio signal via the antenna 1940. The wireless communication interface 1963 may include multiple RF circuits 1964, as shown in FIG. 13. For example, the multiple RF circuits 1964 may support multiple antenna elements. Although FIG. 13 shows an example in which the wireless communication interface 1963 includes the multiple RF circuits 1964, the wireless communication interface 1963 may also include a single RF circuit 1964.

In the eNB 1930 shown in FIG. 13, part or all of the functions of the allocation unit 220 in the electronic device 200 described with reference to FIG. 2 may be implemented by the controller 1951, for example, by executing instructions stored in the memory 1952.

Application Example Regarding User Equipment

First Application Example

Figure 14:
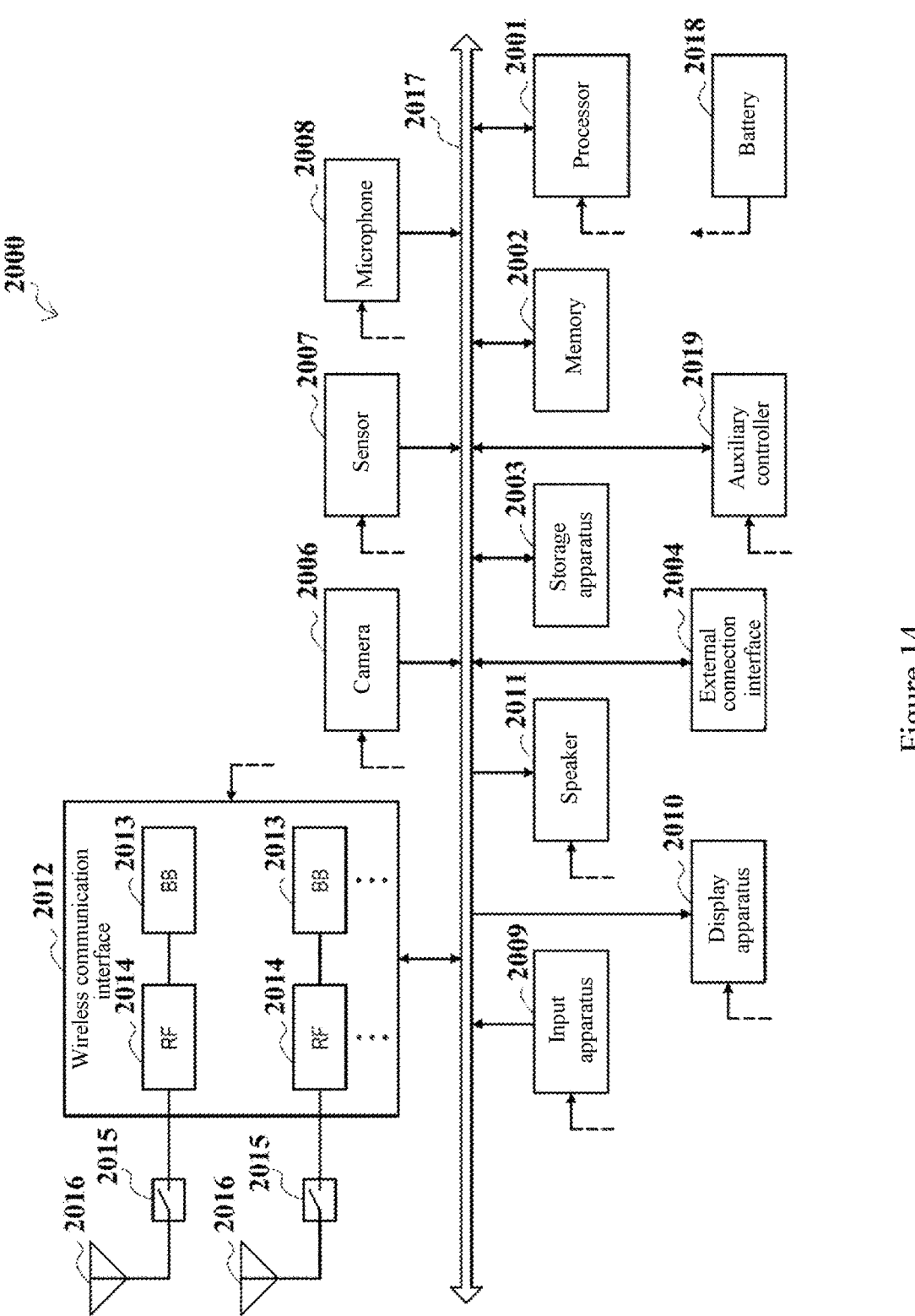
FIG. 14 is a block diagram showing an example of a schematic configuration of a smartphone to which the technology of the present disclosure may be applied.

FIG. 14 is a block diagram showing an example of a schematic configuration of a smartphone 2000 to which the technology of the present disclosure may be applied. The smartphone 2000 includes a processor 2001, a memory 2002, a storage apparatus 2003, an external connection interface 2004, a camera 2006, a sensor 2007, a microphone 2008, an input apparatus 2009, a display apparatus 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on chip (SoC), and control functions of an application layer and additional layer of the smartphone 2000. The memory 2002 includes an RAM and an ROM, and stores a program that is executed by the processor 2001, and data. The storage apparatus 2003 may include a storage medium such as a semiconductor memory and a hard disk. The external connection interface 2004 is an interface configured to connect an external apparatus (such as a memory card and a universal serial bus (USB) apparatus) to the smartphone 2000.

The camera 2006 includes an image sensor (such as a Charge Coupled Device (CCD) and a Complementary Metal Oxide Semiconductor (CMOS)) and generates a captured image. The sensor 2007 may include a set of sensors, such as a measurement sensor, a gyro sensor, a geomagnetism sensor, and an acceleration sensor. The microphone 2008 converts sounds that are input to the smartphone 2000 into audio signals. The input apparatus 2009 includes, for example, a touch sensor configured to detect touch onto a screen of the display apparatus 2010, a keypad, a keyboard, a button, or a switch, and receive an operation or information inputted from a user. The display apparatus 2010 includes a screen (such as a liquid crystal display (LCD) and an organic light-emitting diode (OLED) display), and displays an output image of the smartphone 2000. The speaker 2011 converts audio signals that are outputted from the smart phone 2000 to sounds.

The wireless communication interface 2012 supports any cellular communication scheme (such as LTE and LTE-advanced), and performs wireless communication. The wireless communication interface 2012 may generally include for example a BB processor 2013 and an RF circuit 2014. The BB processor 2013 may perform encoding/decoding, modulating/demodulating and multiplexing/de-multiplexing for example, and perform various types of signal processing for wireless communication. In addition, the RF circuit 2014 may include for example a frequency mixer, a filter and an amplifier, and transmit and receive a radio signal via the antenna 2016. The wireless communication interface 2012 may be a chip module having the BB processor 2013 and the RF circuit 2014 integrated thereon. As shown in FIG. 14, the wireless communication interface 2012 may include multiple BB processors 2013 and multiple RF circuits 2014. Although FIG. 14 shows an example in which the wireless communication interface 2012 includes multiple BB processors 2013 and multiple RF circuits 2014, the wireless communication interface 2012 may also include a single BB processor 2013 or a single RF circuit 2014.

Furthermore, in addition to a cellular communication scheme, the wireless communication interface 2012 may support another type of wireless communication scheme such as a short-distance wireless communication scheme, a near field communication scheme, and a wireless local area network (LAN) scheme. In this case, the wireless communication interface 2012 may include the BB processor 2013 and the RF circuit 2014 for each wireless communication scheme.

Each of the antenna switches 2015 switches connection destinations of the antennas 916 among multiple circuits (such as circuits for different wireless communication schemes) included in the wireless communication interface 2012.

Each of the antennas 2016 includes a single antenna element or multiple antenna elements (such as multiple antenna elements included in an MIMO antenna), and is used for the wireless communication interface 2012 to transmit and receive a radio signal. The smartphone 2000 may include the multiple antennas 2016, as shown in FIG. 14. Although FIG. 14 shows the example in which the smartphone 2000 includes the multiple antennas 2016, the smartphone 2000 may also include a single antenna 2016.

In addition, the smartphone 2000 may include an antenna 2016 for each wireless communication scheme. In this case, the antenna switch 2015 may be omitted from the configuration of the smartphone 2000.

The bus 2017 connects the processor 2001, the memory 2002, the storage apparatus 2003, the external connection interface 2004, the camera 2006, the sensor 2007, the microphone 2008, the input apparatus 2009, the display apparatus 2010, the speaker 2011, the wireless communication interface 2012, and the auxiliary controller 2019 to each other. The battery 2018 supplies power to blocks of the smartphone 2000 shown in FIG. 14 via feeder lines, which are partially shown as dashed lines in the figure. The auxiliary controller 2019 operates a minimum necessary function of the smart phone 2000, for example, in a sleep mode.

In the smartphone 2000 shown in FIG. 14, part or all of the functions of the generation unit 110 in the electronic device 100 described with reference to FIG. 1 may be implemented by the processor 2001 and/or the auxiliary controller 2019, for example, by executing instructions stored in the memory 2002 or the storage apparatus 2003.

Second Application Example

Figure 15:
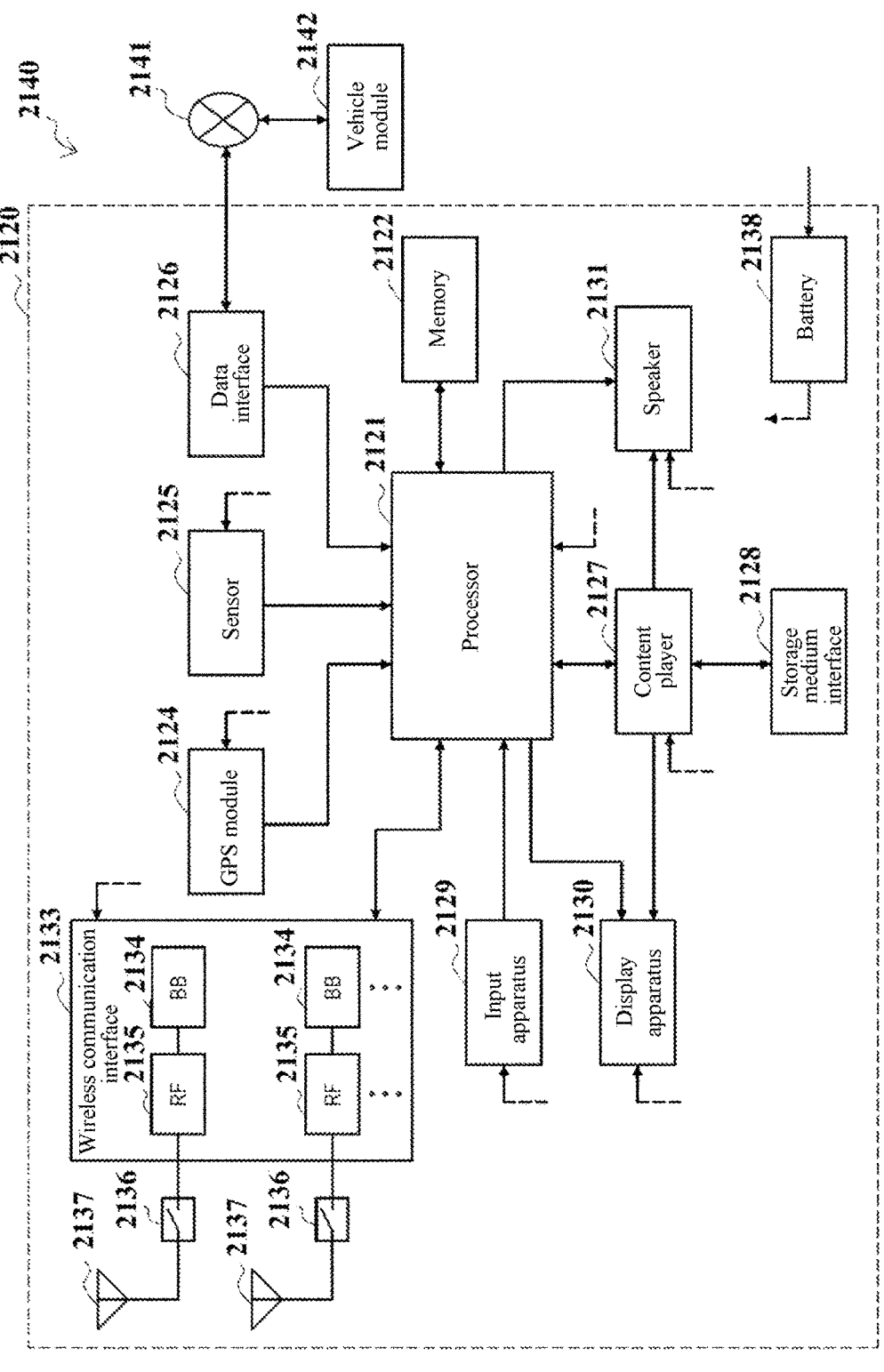
FIG. 15 is a block diagram illustrating an example of a schematic configuration of a vehicle navigation device to which the technology of the present disclosure may be applied.

FIG. 15 is a block diagram illustrating an example of a schematic configuration of a vehicle navigation device 2120 to which the technology of the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input apparatus 2129, a display apparatus 2130, a speaker 2131, a wireless communication interface 2133, one or more antenna switches 2136, one or more antennas 2137, and a battery 2138.

The processor 2121 may be, for example, a CPU or a SoC, and control a navigation function and additional function of the vehicle navigation device 2120. The memory 2122 includes an RAM and an ROM, and stores a program that is executed by the processor 2121, and data.

The GPS module 2124 determines a position (such as latitude, longitude, and altitude) of the vehicle navigation device 2120 by using GPS signals received from a GPS satellite. The sensor 2125 may include a group of sensors such as a gyroscope sensor, a geomagnetic sensor and an air pressure sensor. The data interface 2126 is connected to, for example, an in-vehicle network 2141 via a terminal that is not shown, and acquires data generated by the vehicle (such as vehicle speed data).

The content player 2127 reproduces content stored in a storage medium (such as a CD and a DVD) inserted into the storage medium interface 2128. The input apparatus 2129 includes, for example, a touch sensor configured to detect touch on a screen of the display apparatus 2130, a button, or a switch, and receives an operation or information inputted by a user. The display apparatus 2130 includes a screen such as a LCD or an OLED display, and displays an image of the navigation function or content that is reproduced. The speaker 2131 outputs sounds of the navigation function or the content that is reproduced.

The wireless communication interface 2133 supports any cellular communication scheme (such as LTE and LTE-advanced) and performs wireless communication. The wireless communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for wireless communication. In addition, the RF circuit 2135 may include for example a frequency mixer, a filter and an amplifier, and transmit and receive a radio signal via the antenna 2137. The wireless communication interface 2133 may be a chip module having the BB processor 2134 and the RF circuit 2135 integrated thereon. The wireless communication interface 2133 may include multiple BB processors 2134 and multiple RF circuits 2135, as shown in FIG. 15. Although FIG. 15 shows an example in which the wireless communication interface 2133 includes multiple BB processors 2134 and multiple RF circuits 2135, the wireless communication interface 2133 may also include a single BB processor 2134 and a single RF circuit 2135.

Furthermore, in addition to a cellular communication scheme, the wireless communication interface 2133 may support another type of wireless communication scheme such as a short-distance wireless communication scheme, a near field communication scheme, and a wireless LAN scheme. In this case, the wireless communication interface 2133 may include a BB processor 2134 and an RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes single antenna element or multiple antenna elements (such as multiple antenna elements included in a MIMO antenna) and is used by the wireless communication interface 2133 to transmit and receive a radio signal. As shown in FIG. 15, the vehicle navigation device 2120 may include multiple antennas 2137. Although FIG. 15 illustrates an example in which the vehicle navigation device 2120 includes multiple antennas 2137, the vehicle navigation device 2120 may also include a single antenna 2137.

In addition, the vehicle navigation device 2120 may include an antenna 2137 for each wireless communication scheme. In this case, the antenna switches 2136 may be omitted from the configuration of the vehicle navigation device 2120.

The battery 2138 supplies power to the blocks of the vehicle navigation device 2120 shown in FIG. 15 via a feeder line, which is partially shown with a dash line in the figure. The battery 2138 accumulates power provided by the vehicle.

In the vehicle navigation device 2120 shown in FIG. 15, part or all of the functions of the generation unit 110 in the electronic device 100 described with reference to FIG. 1 may be implemented by the processor 2121, for example, by executing instructions stored in the memory 2122.

The technology of the present disclosure may also be implemented as an in-vehicle system (or a vehicle) 2140 including one or more of the vehicle navigation device 2120, a vehicle network 2141 and a vehicle module 2142. The vehicle module 2142 generates vehicle data (such as vehicle speed, engine speed, and trouble information), and outputs the generated data to the in-vehicle network 2141.

Preferred embodiments of the disclosure have been described above with reference to the drawings, but the present disclosure is not limited to the above examples of course. Those skilled in the art may make various alternations and modifications within the scope of the appended claims. It should be understood that these alternations and modifications shall naturally fall within the technical scope of the present disclosure.

For example, units shown by a dotted line block in the functional block diagram shown in the drawings indicate that the functional units are optional in the corresponding device, and the optional functional units may be combined appropriately to achieve required functions.

For example, multiple functions implemented by one unit in the above embodiments may be implemented by separate apparatus. Alternatively, multiple functions implemented by multiple units in the above embodiments may be implemented by separate apparatus, respectively. Furthermore, one of the above functions may be implemented by multiple units. Apparently, such configurations are within the technical scope of the present disclosure.

In the specification, steps described in the flowchart include not only the processes performed chronologically as the described sequence, but also the processes performed in parallel or individually rather than chronologically. Furthermore, the steps performed chronologically may be performed in other order appropriately.

Furthermore, the present disclosure may be of the following configuration.

Scheme 1. An electronic device, comprising:
a processing circuit configured to:
generate association information for a first data transmission of a first user equipment, wherein the association information indicates an association relationship between the first data transmission and a second data transmission of the first user equipment or a second user equipment; and
send the association information together with QoS parameters of a QoS flow carrying the first data transmission to a base station side device, such that the base station side device allocates transmission resources for the first data transmission and/or the second data transmission based on the association information.

Scheme 2. The electronic device according to Scheme 1, wherein the association information includes association type information indicating an association type to which the association relationship belongs.

Scheme 3. The electronic device according to Scheme 2, wherein the association type includes one or more of synchronization association, switchable association, trigger association, complementary change association, similar change association and coexistence association.

Scheme 4. The electronic device according to Scheme 3, wherein the association information further includes an association parameter related to the association type.

Scheme 5. The electronic device according to Scheme 4, wherein the association parameter includes a synchronization association parameter, which indicates a time range and granularity of synchronous transmission between the first data transmission and the second data transmission.

Scheme 6. The electronic device according to Scheme 4, wherein the association parameter includes a switching association parameter, which indicates a data level corresponding to the first data transmission.

Scheme 7. The electronic device according to Scheme 4, wherein the association parameter includes a trigger association parameter, which indicates a trigger delay between the first data transmission and the second data transmission.

Scheme 8. The electronic device according to Scheme 4, wherein the association parameter includes a complementary change association parameter, which indicates a transmission requirement of the first data transmission that has a complementary change trend to the transmission requirement of the second data transmission.

Scheme 9. The electronic device according to Scheme 4, wherein the association parameter includes a similar change association parameter, which indicates a transmission requirement of the first data transmission that has a similar change trend to the transmission requirement of the second data transmission.

Scheme 10. An electronic device, comprising:
a processing circuit configured to:
receive association information for a first data transmission of a first user equipment that is sent together with QoS parameters of a QoS flow carrying the first data transmission, wherein the association information indicates an association relationship between the first data transmission and a second data transmission of the first user equipment or a second user equipment; and
allocate transmission resources for the first data transmission and/or the second data transmission based on the association information.

Scheme 11. The electronic device according to Scheme 10, wherein the association information includes association type information indicating an association type to which the association relationship belongs.

Scheme 12. The electronic device according to Scheme 11, wherein the association type includes one or more of synchronization association, switchable association, trigger association, complementary change association, similar change association and coexistence association.

Scheme 13. The electronic device according to Scheme 12, wherein the association information further includes an association parameter related to the association type.

Scheme 14. The electronic device according to Scheme 13, wherein the association parameter includes a synchronization association parameter, which indicates a time range and granularity of synchronous transmission between the first data transmission and the second data transmission, and wherein,
the processing circuit is configured to allocate, for the first data transmission and the second data transmission, transmission resources that meet requirements of the time range and the granularity of the synchronous transmission indicated by the synchronization association parameter.

Scheme 15. The electronic device according to Scheme 13, wherein the association parameter includes a switching association parameter, which indicates a data level corresponding to the first data transmission, and wherein,
the processing circuit is configured to: allocate, in a case that a data level determined based on a transmission quality of and/or available transmission resources for the first data transmission or the second data transmission correspond to the data level indicated by the switching association parameter, transmission resources of the indicated data level for the first data transmission.

Scheme 16. The electronic device according to Scheme 13, wherein the association parameter includes a trigger association parameter, which indicates a trigger delay between the first data transmission and the second data transmission, and wherein,
the processing circuit is configured to allocate, for a triggered party in the first data transmission and the second data transmission, transmission resources involving the trigger delay indicated by the trigger association parameter with respect to transmission time of a trigger party in the first data transmission and the second data transmission.

Scheme 17. The electronic device according to Scheme 13, wherein the association parameter includes a complementary change association parameter, which indicates a transmission requirement of the first data transmission that has a complementary change trend to the transmission requirement of the second data transmission, and wherein,
the processing circuit is configured to allocate, based on the change trend of the transmission requirement indicated by the complementary change association parameter of the first data transmission, transmission resources with an opposite change trend in terms of the transmission requirement for the second data transmission.

Scheme 18. The electronic device according to Scheme 13, wherein the association parameter includes a similar change association parameter, which indicates a transmission requirement of the first data transmission that has a similar change trend to the transmission requirement of the second data transmission, and wherein,
the processing circuit is configured to allocate, based on the change trend of the transmission requirement indicated by the similar change parameter of the first data transmission, transmission resources with an similar change trend in terms of the transmission requirement for the second data transmission.

Scheme 19. The electronic device according to Scheme 12, wherein the association type information indicates a coexistence association, and wherein,
the processing circuit is configured to determine whether to continue to allocate transmission resources for the second data transmission based on whether the first data transmission is in progress.

Scheme 20. A communication method, comprising:
generating association information for a first data transmission of a first user equipment, wherein the association information indicates an association relationship between the first data transmission and a second data transmission of the first user equipment or a second user equipment; and
sending the association information to a base station side device, such that the base station side device allocates transmission resources for the first data transmission and/or the second data transmission based on the association information.

Scheme 21. A communication method, comprising:

receiving association information for a first data transmission of a first user equipment, wherein the association information indicates an association relationship between the first data transmission and a second data transmission of the first user equipment or a second user equipment; and allocating transmission resources for the first data transmission and/or the second data transmission based on the association information.

Scheme 22. A computer readable storage medium comprising executable computer instructions which, when being executed by a computer, cause the computer to implement the wireless communication method according to Scheme 20 or 21.

Embodiments of the present disclosure are described above in detail in conjunction with the drawings. However, it should be understood that the embodiments described above are intended to illustrate the present disclosure rather than limit the present disclosure. Those skilled in the art may make various modifications and alternations to the above embodiments without departing from the spirit and scope of the present disclosure. Therefore, the scope of the present disclosure is defined by the appended claims and equivalents thereof.

The invention claimed is:

1. An electronic device, comprising:
a processing circuit configured to:
provide association information for indicating an association relationship between a first data transmission of a first user equipment and a second data transmission of the first user equipment or a second user equipment and a time range of the association relationship; and
send the association information to a base station side device, such that the base station side device allocates transmission resources for the first data transmission and/or the second data transmission based on the association information,
wherein the association information includes association type information indicating an association type to which the association relationship belongs,
wherein the association type includes one or more of
synchronization association,
switchable association,
trigger association,
complementary change association,
similar change association or
coexistence association, and
wherein the association information indicates an association relationship of coexistence association, and
wherein the coexistence association indicates that when one of the first data transmission or the second data transmission is not in progress, the other of the first data transmission or the second data transmission does not take place.

2. The electronic device according to claim 1,
wherein the association information further indicates a granularity of an associated transmission to be performed by the first data transmission with the second data transmission.

3. The electronic device according to claim 2,
wherein the association information is included in a Quality of Service (QoS) profiled of a QoS flow that is carrying the first data transmission.

4. The electronic device according to claim 3,
wherein the first data transmission and the second data transmission belong to different data packets of a same data service in a same QoS flow, and
the granularity of the associated transmission is a data packet.

5. The electronic device according to claim 1, wherein the processing circuit is further configured to:
monitor whether the first data transmission is in progress, and
notify the base station side device to continue or stop allocating transmission resources to the second data transmission.

6. The electronic device according to claim 1,
wherein the association information indicates an association relationship of complementary change association, and
the complementary change association indicates a transmission requirement of the first data transmission that has a complementary change trend to the transmission requirement of the second data transmission.

7. An electronic device, comprising:
a processing circuit configured to:
receive association information for indicating an association relationship between a first data transmission of a first user equipment and a second data transmission of the first user equipment or a second user equipment and a time range of the association relationship; and
allocate transmission resources for the first data transmission and/or the second data transmission based on the association information,
wherein the association information includes association type information indicating an association type to which the association relationship belongs,
wherein the association type includes one or more of
synchronization association,
switchable association,
trigger association,
complementary change association,
similar change association or
coexistence association, and
wherein the association information indicates an association relationship of coexistence association, and
wherein the coexistence association indicates that when one of the first data transmission or the second data transmission is not in progress, the other of the first data transmission or the second data transmission does not take place.

8. The electronic device according to claim 7,
wherein the association information further indicates a granularity of an associated transmission to be performed by the first data transmission with the second data transmission.

9. The electronic device according to claim 8,
wherein the association information is included in a Quality of Service (QoS) profiled of a QoS flow that is carrying the first data transmission.

10. The electronic device according to claim 9,
wherein the first data transmission and the second data transmission belong to different data packets of a same data service in a same QoS flow, and
the granularity of the associated transmission is a data packet.

11. The electronic device according to claim 7, wherein the processing circuit is further configured to
determine whether to continue to allocate transmission resources for the second data transmission based on whether the first data transmission is in progress.

12. The electronic device according to claim 7,
wherein the association information indicates an association relationship of complementary change association,
the complementary change association indicates a transmission requirement of the first data transmission that has a complementary change trend to the transmission requirement of the second data transmission, and
the processing circuit is configured to
allocate, based on the change trend of the transmission requirement indicated by the association relationship of the complementary change association of the first data transmission, transmission resources with an opposite change trend in terms of the transmission requirement for the second data transmission.

13. A communication method performed by an electronic device, the communication method comprising:
providing association information for indicating an association relationship between a first data transmission of a first user equipment and a second data transmission of the first user equipment or a second user equipment and a time range of the association relationship; and
sending the association information to a base station side device, such that the base station side device allocates transmission resources for the first data transmission and/or the second data transmission based on the association information,
wherein the association information includes association type information indicating an association type to which the association relationship belongs,
wherein the association type includes one or more of
synchronization association,
switchable association,
trigger association,
complementary change association,
similar change association or
coexistence association, and wherein the association information indicates an association relationship of coexistence association, and
wherein the coexistence association indicates that when one of the first data transmission or the second data transmission is not in progress, the other of the first data transmission or the second data transmission does not take place.

14. A communication method performed by an electronic device, the communication method comprising:
receiving association information for indicating an association relationship between a first data transmission of a first user equipment and a second data transmission of the first user equipment or a second user equipment and a time range of the association relationship; and
allocating transmission resources for the first data transmission and/or the second data transmission based on the association information,
wherein the association information includes association type information indicating an association type to which the association relationship belongs,
wherein the association type includes one or more of
synchronization association,
switchable association,
trigger association,
complementary change association,
similar change association or
coexistence association, and
wherein the association information indicates an association relationship of coexistence association, and
wherein the coexistence association indicates that when one of the first data transmission or the second data transmission is not in progress, the other of the first data transmission or the second data transmission does not take place.

* * * * *